US011113186B1

(12) United States Patent
Hussain et al.

(10) Patent No.: US 11,113,186 B1
(45) Date of Patent: Sep. 7, 2021

(54) TESTING AND PUBLISHING OF RESOURCE HANDLERS IN A CLOUD ENVIRONMENT

(71) Applicant: Amazon Technologies, Inc., Seattle, WA (US)

(72) Inventors: Amjad Hussain, Bellevue, WA (US); Diwakar Chakravarthy, Kirkland, WA (US); Ryan John Lohan, Seattle, WA (US); Sayali Suhas Deshpande, Seattle, WA (US); Xiaodong Ma, Seattle, WA (US); Bharath Swaminathan, Issaquah, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 16/714,399

(22) Filed: Dec. 13, 2019

(51) Int. Cl.
*G06F 9/44* (2018.01)
*G06F 8/41* (2018.01)
*G06F 11/36* (2006.01)
*G06F 8/71* (2018.01)
*G06F 8/34* (2018.01)
(Continued)

(52) U.S. Cl.
CPC ........... *G06F 11/3688* (2013.01); *G06F 8/34* (2013.01); *G06F 8/71* (2013.01); *G06F 11/3664* (2013.01); *G06F 11/3692* (2013.01); *G06F 8/33* (2013.01); *G06F 8/36* (2013.01); *G06F 8/60* (2013.01);
(Continued)

(58) Field of Classification Search
CPC ............. G06F 11/3688; G06F 11/3664; G06F 11/3692; G06F 11/0751; G06F 11/2023; G06F 11/30; G06F 11/3409; G06F 11/36; G06F 8/34; G06F 8/71; G06F 8/33; G06F 8/433; G06F 8/36; G06F 8/30; G06F 8/60; G06F 9/45558; G06F 9/45537; G06F 9/45533; G06F 9/5083; G06F 9/44505; G06F 9/455; G06F 9/5077; G06F 9/5072
See application file for complete search history.

(56) References Cited

U.S. PATENT DOCUMENTS

| 8,234,640 B1 * | 7/2012 | Fitzgerald | G06F 21/56 718/1 |
| 8,365,138 B2 * | 1/2013 | Iborra | G06F 8/35 717/104 |

(Continued)

OTHER PUBLICATIONS

Lizhe Wang et al., Provide Virtual Machine Information for Grid Computing, Nov. 2010, [Retrieved on Apr. 21, 2021]. Retrieved from the internet: <URL: https://ieeexplore.ieee.org/stamp/stamp.jsp?tp=&arnumber=5546997> 13 Pages (1362-1374) (Year: 2010).*

(Continued)

*Primary Examiner* — Anibal Rivera
(74) *Attorney, Agent, or Firm* — Lee & Hayes, P.C.

(57) ABSTRACT

This disclosure describes techniques for testing and publishing of resource handlers in a cloud environment. For example, a code-development interface may be utilized to generate initial code for the building of resource handlers. The initial code may be verified and the resource handlers may be built and deployed to a test platform. One or more execution tests may be run on the resource handlers in the test platform to determine if the resource handlers execute successfully. The resource type associated with the resource handlers may be published to a registry service and the resource type may be made available for provisioning.

20 Claims, 13 Drawing Sheets

(51) Int. Cl.
*G06F 11/34* (2006.01)
*G06F 11/07* (2006.01)
*G06F 11/20* (2006.01)
*G06F 8/36* (2018.01)
*G06F 8/60* (2018.01)
*G06F 8/33* (2018.01)

(52) U.S. Cl.
CPC ...... *G06F 11/0751* (2013.01); *G06F 11/2023* (2013.01); *G06F 11/3409* (2013.01)

(56) References Cited

U.S. PATENT DOCUMENTS

| | | | | |
|---|---|---|---|---|
| 8,433,771 | B1* | 4/2013 | Ellsworth | H04L 67/125 709/213 |
| 8,612,971 | B1* | 12/2013 | Fitzgerald | G06F 9/45558 718/1 |
| 8,732,693 | B2* | 5/2014 | Mutisya | G06F 11/3688 717/176 |
| 9,590,872 | B1* | 3/2017 | Jagtap | H04L 41/145 |
| 9,612,815 | B1* | 4/2017 | Jagtap | G06F 8/61 |
| 9,754,303 | B1* | 9/2017 | Jagtap | G06Q 30/0621 |
| 9,983,860 | B1* | 5/2018 | Koty | H04L 67/10 |
| 10,193,961 | B2* | 1/2019 | Frank | H04L 41/0866 |
| 10,210,074 | B1* | 2/2019 | Szerenyi | G06F 11/3688 |
| 10,318,265 | B1* | 6/2019 | To | H04L 67/34 |
| 10,320,625 | B1* | 6/2019 | Cherumbath | H04L 41/0806 |
| 10,776,482 | B2* | 9/2020 | Gan | G06F 11/3409 |
| 2008/0134175 | A1* | 6/2008 | Fitzgerald | G06F 21/53 718/1 |
| 2008/0134176 | A1* | 6/2008 | Fitzgerald | G06F 11/0751 718/1 |
| 2008/0134178 | A1* | 6/2008 | Fitzgerald | G06F 9/45537 718/1 |
| 2009/0249284 | A1* | 10/2009 | Antosz | H04L 41/5054 717/104 |
| 2011/0055714 | A1* | 3/2011 | Vemulapalli | G06F 9/45558 715/739 |
| 2011/0126197 | A1* | 5/2011 | Larsen | G06F 9/455 718/1 |
| 2013/0166703 | A1* | 6/2013 | Hammer | H04L 63/10 709/220 |
| 2013/0174117 | A1* | 7/2013 | Watters | G06F 8/71 717/106 |
| 2013/0174122 | A1* | 7/2013 | Watters | G06F 8/36 717/121 |
| 2013/0174124 | A1* | 7/2013 | Watters | G06F 8/71 717/122 |
| 2013/0247045 | A1* | 9/2013 | Fitzgerald | G06F 9/45558 718/1 |
| 2014/0019960 | A1* | 1/2014 | Jacklin | G06F 9/5077 718/1 |
| 2014/0019967 | A1* | 1/2014 | Gupta | G06F 9/455 718/1 |
| 2014/0059540 | A1* | 2/2014 | Gupta | G06F 9/44505 718/1 |
| 2014/0337830 | A1* | 11/2014 | Schwaninger | G06F 8/63 717/177 |
| 2015/0058459 | A1* | 2/2015 | Amendjian | G06F 9/45558 709/223 |
| 2015/0143363 | A1* | 5/2015 | Gombert | G06F 9/5083 718/1 |
| 2015/0220327 | A1* | 8/2015 | Poon | G06F 16/21 717/120 |
| 2015/0220330 | A1* | 8/2015 | Borden | G06F 8/71 717/121 |
| 2015/0324219 | A1* | 11/2015 | Fitzgerald | G06F 21/53 718/1 |
| 2016/0048408 | A1* | 2/2016 | Madhu | G06F 11/2023 718/1 |
| 2016/0103662 | A1* | 4/2016 | Di Balsamo | G06F 8/36 717/107 |
| 2017/0060969 | A1* | 3/2017 | Dhayapule | G06F 16/254 |
| 2017/0163518 | A1* | 6/2017 | Dube | H04L 41/5054 |
| 2017/0177324 | A1* | 6/2017 | Frank | G06F 16/173 |
| 2017/0180266 | A1* | 6/2017 | Frank | H04L 67/16 |
| 2017/0180459 | A1* | 6/2017 | Frank | H04L 41/5048 |
| 2017/0180487 | A1* | 6/2017 | Frank | H04L 41/0813 |
| 2017/0207970 | A1* | 7/2017 | Macatangay | H04L 41/0866 |
| 2017/0322929 | A1* | 11/2017 | Hussain | G06F 9/45558 |
| 2017/0364844 | A1* | 12/2017 | Saraf | G06Q 10/0633 |
| 2018/0115551 | A1* | 4/2018 | Cole | H04L 41/18 |
| 2019/0303115 | A1* | 10/2019 | Kelly | G06F 8/33 |
| 2020/0004571 | A1* | 1/2020 | Piwonka | G06F 8/30 |
| 2020/0028772 | A1* | 1/2020 | Laslau | H04L 41/145 |
| 2020/0278920 | A1* | 9/2020 | Khakare | G06F 9/45558 |

OTHER PUBLICATIONS

Gabor Kecskemeti et al., Virtual Appliance Size Optimization with Active Fault Injection, Oct. 2012, [Retrieved on Apr. 21, 2021]. Retrieved from the internet: <URL: https://ieeexplore.ieee.org/stamp/stamp.jsp?tp=&arnumber=6122019> 13 Pages (1983-1995) (Year: 2012).*

* cited by examiner

CODE-DEVELOPMENT INTERFACE 104

Computing Resource Management https://www.console.serviceproviderABC.com/ResourceManagement

RESOURCE MANAGEMENT CONSOLE 402

[Create Stack ▼] [Actions ▼]  [Use Resource Type]  [Create Resource Type]

| Logical ID | Service Provider Network | Type | Status | Description |
|---|---|---|---|---|
| ☐ Server | Service Provider Network ABC | Compute | Create_Complete | Provides compute for … |
| ☑ Queue | Service Provider Network DEF | Queue | Create_InProgress | Being developed |

Resource Type

```
Input: {
  "resourceTypeName": "Network1::Logs::MetricFilter",
  "type": "RESOURCE",
  "bucketName": "registryservice-packagebucket-1234",
  "databaseKey": "9876ABCD",
  "invocationToken": "23049930944",
  "namespace": "9876ABCD",
  "sourceUrl": <url>,
  "description": "Description 1",
  "loggingConfig": <iam_role_arn>,
  "executionRoleArn": "arn:Network1:iam::<account_id>:role/DependencyStack-4j4-ExectionRole-3jdl"
  ⋮
}
```

Choose template language: ● JSON ○ YAML …

RESOURCE TYPE LIST 404

RESOURCE TYPE INTERFACE 406

FIG. 4

TESTING AND PUBLISHING OF RESOURCE HANDLERS IN A CLOUD ENVIRONMENT

BACKGROUND

Service provider networks offer network-based services to fulfill users' computing-service needs without the users having to invest in and maintain computing infrastructure required to implement the services. For example, service providers may operate networks of data centers housing significant numbers of interconnected computing systems, such as public data centers, that are configured by the service provider to provide cloud-based services to users. These service provider networks may provide network-based computing resources on an as-needed basis. For example, a service provider network may permit users to purchase and utilize computing resources such as virtual machine ("VM") instances, data storage resources, database resources, networking resources, network services, and other types of computing resources. Users may configure the computing resources provided by a service provider network to implement desired functionality, such as to provide a network-based application or another type of functionality. Users may also desire to integrate computing resources not provided by the service provider network with those computing resources that are provided by the service provider network.

Thus, a given user may desire to have computing resources provisioned and managed in multiple networks including the service provider network. Described herein are improvements in technology and solutions to technical problems that can be used to, among other things, allow types of computing resources to be provisioned and managed in multiple networks.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

FIG. 4 illustrates an example code-development interface, such as a graphic user interface (GUI), for receiving input to generate resource handlers.

DETAILED DESCRIPTION

Figure 1:
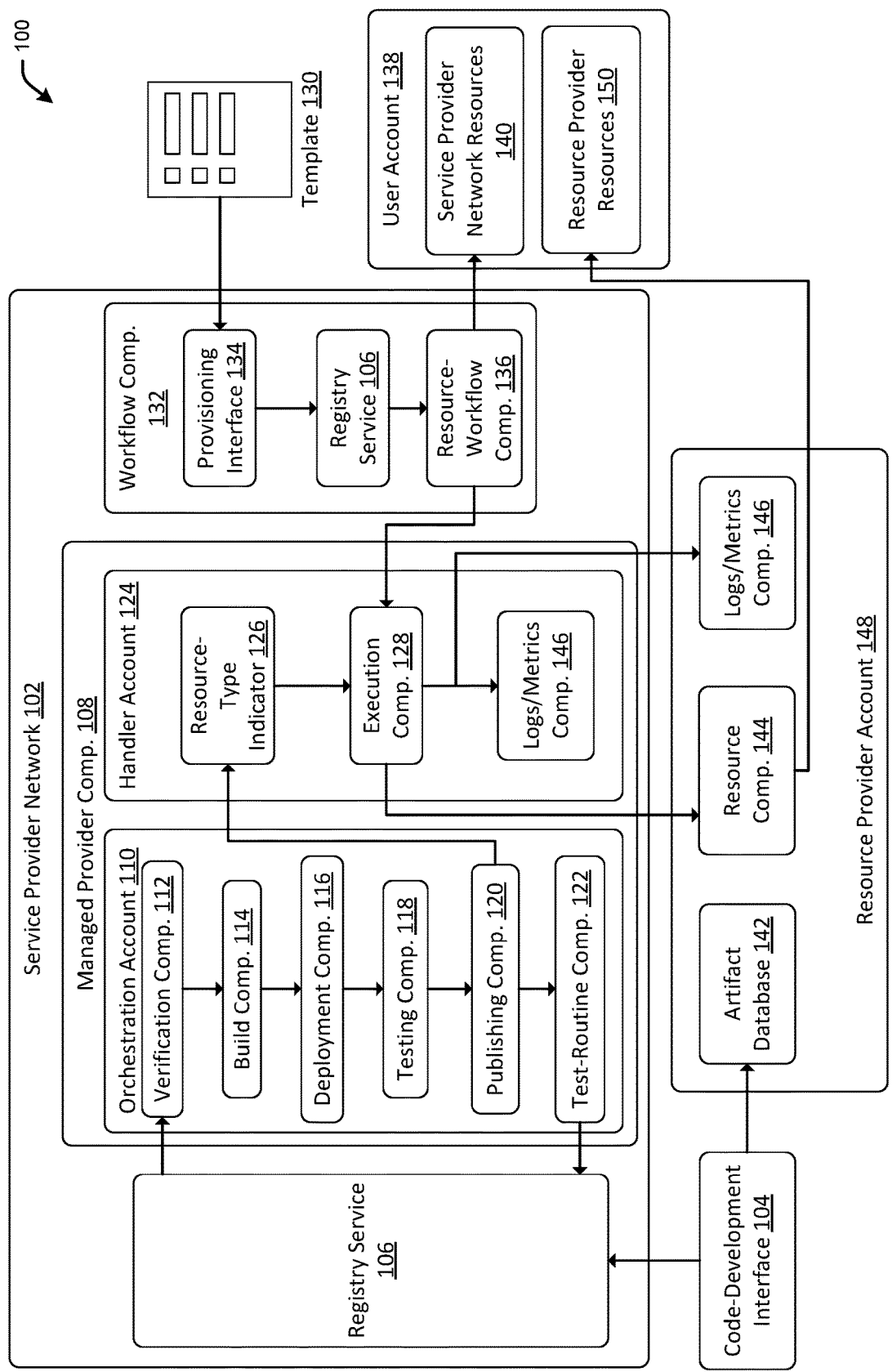
FIG. 1 illustrates an architecture diagram of an example environment for testing and publishing of resource handlers in a cloud environment.

This disclosure describes, at least in part, techniques for testing and publishing resource handlers in a cloud environment. For example, a service provider network may host, or provide, a centralized management service that provides an open source framework allowing users, or developers, to use a code-development interface or console to manage computing resources and services that are provisioned in different service provider networks and/or in a resource publisher system. For example, the host service provider network may allow users to utilize the code-development interface to model, provision, and operate computing resources that are provided by the host service provider network itself, as well as other service provider networks managed by different service providers and/or resource publisher systems.

For example, a resource publisher may provide input to the code-development interface that indicates a resource type associated with a given computing resource. The computing resource may be hosted by the resource publisher system and/or by a service provider network other than the host service provider network associated with the code-development interface. In examples, the input may define infrastructure schemas for different resource types, such as new resource types, provided by the secondary service provider network and/or the resource publisher system. For example, the code-development interface may provide users with structured schemas, or "meta schemas," to create infrastructure templates using a structure/predefined format or syntax, but that are usable to provision and operate computing resources across a variety of different service provider networks and/or publisher systems. The schemas may define properties of the resource type of the computing resource, such as provisioning semantics. Further, the infrastructure schemas may be published or stored in an open provider registry, or an accessible repository, such that other users may access and share infrastructure schemas defining different resource types. In examples, the input may indicate the resource type and the infrastructure schemas may be generated and provided to the user via the code-development interface. In other examples, the input may include the infrastructure schemas.

Based at least in part on receiving input data indicating the resource type and/or the schemas, the service provider network may provide, utilizing the code-development interface, one or more scaffolds associated with the resource type. Scaffolding includes techniques wherein specifications for how an application database may be used are specified. A compiler or framework may utilize these specifications, together with pre-defined code templates, to generate code that the application may utilize to perform operations associated with database entries, such as creating, reading, updating, deleting, etc. The scaffolds may indicate where one or more functions are to be input to generate resource handlers associated with the resource type. The code-development interface may utilize the functions as provided by the user to generate an artifact object associated with the resource type. Additionally, an indication of the resource type may be published to a registry service of the service provider network.

The service provider network may initiate a managed provider runtime in which a number of step functions may be performed to verify the artifact object, build one or more resource handlers, publish those resource handlers to a test platform, perform execution tests on the resource handlers, publish the resource handlers to the registry service for later use, and generate test routines associated with execution of the resource handlers. For example, during the managed provider runtime, a verification component may receive an indication from the registry service that a resource type has been developed utilizing the code-development interface. The verification component may perform a static code analysis of the artifact to determine whether one or more security constraints are met and/or that one or more security policies are not violated by the artifact. For example, if the artifact includes one or more embedded secrets or information that may create a security risk to the publisher, the verification component may return results indicating that the artifact as generated utilizing the code-development interface did not satisfy the static code analysis. A notification of the results may be generated and may be displayed, such as using the code-development interface, to allow the user to be informed of the error and to take corrective action, if desired.

In instances where the verification component determines that the artifact satisfies the static code analysis, a build component may be configured to generate one or more resource handlers utilizing the artifact. Generation of the resource handlers may include the generation of code that, when executed, results in an instance of the type of the computing resource being created. The resource handlers may allow for one or more functionalities associated with the computing resource to be performed. For example, the resource handlers may be utilized to create an instance of the computing resource, to duplicate an instance of the computing resource, to read an instance of the computing resource and/or data associated with the computing resource, to list information associated with the computing resource, to delete an instance of the computing resource, to perform one or more check operations associated with the computing resource, to update the computing resource, and/or to perform one or more operations on the computing resource.

A deployment component may be utilized, once the resource handlers are built by the build component, to publish the resource handlers in association with a test platform. The test platform may be configured to allow for the testing of execution of resource handlers prior to publishing the resource handlers for use outside a testing environment. The test platform may be configured to allow for the resource handlers to be called to perform the one or more functionalities described herein. The test platform may be configured such that execution of the resource handlers on the test platform does not impact the service provider network (other than the test platform).

A testing component may be utilized to perform one or more execution tests when executing the resource handlers on the test platform. The execution tests may include testing the resource handler's ability to perform the one or more functions associated with the computing resource, such as the ability to create, delete, read, list, update, and/or operate an instance of the computing resource, for example. The execution tests may be predetermined by the service provider network and may be based at least in part on the resource type of the computing resource, one or more parameters associated with the schema and/or functions provided during artifact generation, one or more attributes of the service provider network and/or resource publisher system hosting the computing resource. The execution tests may also include schema validation, which may include validating definitions and/or syntax associated with the resource handlers. Doing so may ensure that naming conventions and/or code structure of the resource handlers complies with one or more rules and/or guidelines associated with the service provider network. In examples, the execution tests may include performing multiple instances of the same test to determine that execution of the resource handlers is likely to produce repeatable successful results. In these examples, one or more variables associated with the execution tests may be modified to determine if any of those variables impact the successful execution of the resource handlers. In these and other examples, a percentage of successful executions, or similar metrics indicating a likelihood of successful execution, may be generated and utilized to determine whether execution of a given resource handler satisfies the execution tests. Additionally, or alternatively, the publisher may provide input on the execution tests, such as via the code-development interface. For example, the publisher may request that one or more additional execution tests by performed. These user-designated tests may be validated and added to the execution tests to be performed by the testing component.

In examples where the execution tests indicate unsuccessful execution of the resource handlers, a notification may be generated and displayed, such as via the code-development interface. The notification may indicate that execution of at least one of the resource handlers has failed and, if determined by the testing component, an indication of one or more reasons for the fault and/or details associated with the fault. In examples where the execution tests indicate successful execution of the resource handlers, a publishing component may be utilized to publish the resource type of the computing resource to the registry service. Once published to the registry service, the resource type may be available for the publisher and/or other users to utilize for creating instances of the computing resource. The publishing component may also be configured to provide the resource handlers and/or data associated with the resource handlers to a resource-type indicator of a handler account. The resource-type indicator may be utilized during a workflow runtime to identify and/or utilize the resource handlers.

Additionally, a test-routine component may be configured to generate one or more test routines associated with execution of the resource handlers. For example, periodic and/or scheduled execution tests may be performed in association with the resource handlers to ensure that execution of the resource handlers continues to be successful, such as in instances where one or more modifications to the computing resource, the resource provider account, the service provider network, and/or one or more other computing resources occurs. The test-routine component may also be utilized to determine which version of given resource handlers should be executable. For example, a first version indicator of first resource handlers may be stored in association with the resource provider account. Thereafter, second resource handlers associated with the computing resource or another computing resource may be generated and utilized, and a second version identifier of the second resource handlers may be stored in association with the resource provider account. However, during scheduled execution testing, the test-routine component may determine that a number of faults associated with execution of the second resource handlers satisfies a threshold number of faults, and/or that a particular type of fault has occurred. In these examples, the service provider network may determine that the second resource handlers are no longer successfully executing, and the resource type associated with the second resource handlers may be removed from the registry service such that the resource type associated with the first resource handlers remains.

Once the resource type associated with the computing resource has been published to the registry service, one or more users may request that an instance of the computing resource be created and provisioned. To do so, the user may provide input to a provisioning interface configured to display a GUI associated with creating and provisioning computing resources. The GUI may allow for input associated with an infrastructure template that defines configuration data for creating the resource type of the computing resource. The infrastructure template may allow the user to provide an indication of the resource type as well as associated information about the requested creation of an instance of the computing resource. The associated information may include authentication information. For example, during development of the resource handlers, the publisher may provide input indicating that one or more access restrictions to the resource type are to be implemented. The access restrictions may include allowing for only certain user accounts to utilize the resource type, allow for only user accounts that provide correct authentication information to utilize the resource type, etc. This information may be stored in association with the resource handlers and the access restrictions may be applied when the infrastructure template is received. Additionally, one or more usage restrictions may be applied to the resource type, such as an amount of usage of the computing resource and/or a type of usage, such as a geographic region for requested usage. For example, the service provider network may allow for provisioning of computing resource across multiple geographic regions having multiple data centers. Some or all of the data centers may be configured to execute the resource handlers in a unique manner and/or some of the data centers may not be configured to execute the resource handlers. The infrastructure template may indicate the data centers and/or geographic region where execution of the resource handlers is to be performed, and when that indication corresponds to permitted use of the resource handlers, execution of the resource handlers may be permitted.

Once a resource type is identified and any access restrictions are satisfied, the registry service may be called to determine which resource types are associated with a request to provision computing resources. In certain examples, the infrastructure template may indicate multiple computing resources to be provisioned. A resource-workflow component may be configured to determine whether the resource type indicated by the infrastructure template is native to the service provider network or is instead native to another network and/or system. In examples where the resource type is native to the service provider network, the service provider network may create an instance of the resource type native to the service provider network for the user account from which the request was received. In other examples where the infrastructure template indicates the requested resource type is not native to the service provider network, the resource-workflow component may query the handler account associated with the resource type. The handler account may identify the resource handlers corresponding to the resource type and may execute the resource handlers to create an instance of the resource type of the computing resource. To do so, the resource handlers may execute to interact with the resource provider account to create an instance of the computing resource for the user account. The instance of the computing resource may be provisioned to the user account along with, in examples, the service provider network resources, when applicable.

In addition to the above, the handler account may execute one or more of the resource handlers to generate logs and/or metrics associated with execution of the resource handlers. For example, a logs/metrics component may be configured to generate one or more logs and/or metrics indicating performance of the resource handlers, including indications of successful execution, faulty execution, and/or contextual information associated with execution of the resource handlers, such as user accounts to which computing resources have been provisioned. The logs/metrics may be stored in association with the handler account and/or the logs/metrics may be stored in association with the resource provider account. The resource provider may utilize the logs/metrics to update the resource handlers and/or for development of additional and/or different resource handlers.

Certain implementations and embodiments of the disclosure will now be described more fully below with reference to the accompanying figures, in which various aspects are shown. However, the various aspects may be implemented in many different forms and should not be construed as limited to the implementations set forth herein. The disclosure encompasses variations of the embodiments, as described herein. Like numbers refer to like elements throughout.

FIG. 1 illustrates an architecture diagram of an example environment 100 for testing and publishing of resource handlers in a cloud environment.

In examples, a resource publisher may provide input to a code-development interface 104 that indicates a resource type associated with a given computing resource. The computing resource may be hosted by a resource publisher system and/or by a service provider network other than the service provider network 102 associated with the code-development interface 104. In examples, the input may define infrastructure schemas for different resource types, such as new resource types, provided by the secondary service provider network and/or the resource publisher system. For example, the code-development interface 104 may provide users with structured schemas, or "meta schemas," to create infrastructure templates using a structure/predefined format or syntax, but that are usable to provision and operate computing resources across a variety of different service provider networks and/or publisher systems. The schemas may define properties of the resource type of the computing resource, such as provisioning semantics. Further, the infrastructure schemas may be published or stored in an open provider registry, or an accessible repository, such that other users may access and share infrastructure schemas defining different resource types. In examples, the input may indicate the resource type and the infrastructure schemas may be generated and provided to the user via the code-development interface 102. In other examples, the input may include the infrastructure schemas.

Based at least in part on receiving input data indicating the resource type and/or the schemas, the service provider network 102 may provide, utilizing the code-development interface 104, one or more scaffolds associated with the resource type. Scaffolding includes techniques wherein specifications for how an application database may be used are specified. A compiler or framework may utilize these specifications, together with pre-defined code templates, to generate code that the application may utilize to perform operations associated with database entries, such as creating, reading, updating, deleting, etc. The scaffolds may indicate where one or more functions are to be input to generate resource handlers associated with the resource type. The code-development interface 102 may utilize the functions as provided by the user to generate an artifact object associated with the resource type. Additionally, an indication of the resource type may be published to a registry service 106 of the service provider network 102. Also, an indication of the resource type and/or the artifact may be sent to and maintained by an artifact database 142 associated with the resource provider account 148.

The service provider network 102 may initiate a managed provider runtime utilizing a managed provider component 108 in which a number of step functions may be performed to verify the artifact object, build one or more resource handlers, publish those resource handlers to a test platform, perform execution tests on the resource handlers, publish the resource type and/or the resource handlers to the registry service 106 for later use, and generate test routines associated with execution of the resource handlers. For example, during the managed provider runtime, a verification component 112 may receive an indication from the registry service 106 that a resource type has been developed utilizing the code-development interface 104. The verification component 112 may perform a static code analysis of the artifact to determine whether one or more security constraints are met and/or that one or more security policies are not violated by the artifact. For example, if the artifact includes one or more embedded secrets or information that may create a security risk to the publisher, the verification component 112 may return results indicating that the artifact as generated utilizing the code-development interface 104 did not satisfy the static code analysis. A notification of the results may be generated and may be displayed, such as using the code-development interface 104, to inform the user of the error and to take corrective action, if desired.

In instances where the verification component 112 determines that the artifact satisfies the static code analysis, a build component 114 may be configured to generate one or more resource handlers utilizing the artifact. Generation of the resource handlers may include the generation of code that, when executed, results in an instance of the type of the computing resource being created. The resource handlers may allow for one or more functionalities associated with the computing resource to be performed. For example, the resource handlers may be utilized to create an instance of the computing resource, to duplicate an instance of the computing resource, to read an instance of the computing resource and/or data associated with the computing resource, to list information associated with the computing resource, to delete an instance of the computing resource, to perform one or more check operations associated with the computing resource, to update the computing resource, and/or to perform one or more operations on the computing resource.

A deployment component 116 may be utilized, once the resource handlers are built by the build component 114, to publish the resource handlers in association with a test platform. The test platform may be configured to allow for the testing of execution of resource handlers prior to publishing the resource handlers for use outside a testing environment. The test platform may be configured to allow for the resource handlers to be called to perform the one or more functionalities described herein. The test platform may be configured such that execution of the resource handlers on the test platform does not impact the service provider network 102 (other than the test platform).

A testing component 118 may be utilized to perform one or more execution tests when executing the resource handlers on the test platform. The execution tests may include testing the resource handler's ability to perform the one or more functions associated with the computing resource, such as the ability to create, delete, read, list, update, and/or operate an instance of the computing resource, for example. The execution tests may be predetermined by the service provider network 102 and may be based at least in part on the resource type of the computing resource, one or more parameters associated with the schema and/or functions provided during artifact generation, one or more attributes of the service provider network 102 and/or resource publisher system hosting the computing resource. The execution tests may also include schema validation, which may include validating definitions and/or syntax associated with the resource handlers. Doing so may ensure that naming conventions and/or code structure of the resource handlers comply with one or more rules and/or guidelines associated with the service provider network 102. In examples, the execution tests may include perform multiple instances of the same test to determine that execution of the resource handlers is likely to produce repeatable successful results. In these examples, one or more variables associated with the execution tests may be modified to determine if any of those variables impact the successful execution of the resource handlers. In these and other examples, a percentage of successful executions, or similar metrics indicating a likelihood of successful execution, may be generated and utilized to determine whether execution of a given resource handler satisfies the execution tests. Additionally, or alternatively, the publisher may provide input on the execution tests, such as via the code-development interface 104. For example, the publisher may request that one or more additional execution tests by performed. These user-designated tests may be validated and added to the execution tests to be performed by the testing component 118.

In examples where the execution tests indicate unsuccessful execution of the resource handlers, a notification may be generated and displayed, such as via the code-development interface 104. The notification may indicate that execution of at least one of the resource handlers has failed and, if determined by the testing component 118, an indication of one or more reasons for the fault and/or details associated with the fault. In examples where the execution tests indicate successful execution of the resource handlers, a publishing component 120 may be utilized to publish the resource type of the computing resource to the registry service 106. Once published to the registry service 106, the resource type may be available for the publisher and/or other users to utilize for creating the computing resource. The publishing component 120 may also be configured to provide the resource handlers and/or data associated with the resource handlers to a resource-type indicator 126 of a handler account 124. The resource-type indicator 126 may be utilized during a workflow runtime to identify and/or utilize the resource handlers.

Additionally, a test-routine component 122 may be configured to generate one or more test routines associated with execution of the resource handlers. For example, periodic and/or scheduled execution tests may be performed in association with the resource handlers to ensure that execution of the resource handlers continues to be successful, such as in instances where one or more modifications to the computing resource, the resource provider account, the service provider network 102, and/or one or more other computing resources occurs. The test-routine component 122 may also be utilized to determine which version of given resource handlers should be executable. For example, a first version indicator of first resource handlers may be stored in association with a resource provider account 148. Thereafter, second resource handlers associated with the computing resource or another computing resource may be generated and utilized, and a second version identifier of the second resource handlers may be stored in association with the resource provider account 148. However, during scheduled execution testing, the test-routine component 122 may determine that a number of faults associated with execution of the second resource handlers satisfies a threshold number of faults, and/or that a particular type of fault has occurred. In these examples, the service provider network 102 may determine that the second resource handlers are no longer successfully executing, and the resource type associated with the second resource handlers may be removed from the registry service 106 such that the resource type associated with the first resource handlers remains.

Once the resource type associated with the computing resource has been published to the registry service 106, one or more users may request that an instance of the computing resource be created and provisioned. To do so, the user may provide input to a provisioning interface 134 configured to display a graphical user interface associated with creating and provisioning computing resources. The graphical user interface may allow for input associated with an infrastructure template 130 that defines configuration data for creating the resource type of the computing resource. The infrastructure template 130 may allow the user to provide an indication of the resource type as well as associated information about the requested creation of an instance of the computing resource. The associated information may include authentication information. For example, during development of the resource handlers, the publisher may provide input indicating that one or more access restrictions to the resource type are to be implemented. The access restrictions may include allowing for only certain user accounts to utilize the resource type, allowing for only user accounts that provide certain authentication information to utilize the resource type, etc. This information may be stored in association with the resource handlers and the access restrictions may be applied when the infrastructure template 130 is received. Additionally, one or more usage restrictions may be applied to the resource type, such as an amount of usage of the computing resource and/or a type of usage, such as a geographic region for requested usage. For example, the service provider network 102 may allow for provisioning of computing resource across multiple geographic regions having multiple data centers. Some or all of the data centers may be configured to execute the resource handlers in a unique manner and/or some of the data centers may not be configured to execute the resource handlers. The infrastructure template 130 may indicate the data centers and/or geographic region where execution of the resource handlers is to be performed, and when that indication corresponds to permitted use of the resource handlers, execution of the resource handlers may be permitted.

Once a resource type is identified and any access restrictions are satisfied, the registry service 106 may be called to determine which resource types are associated with a request to provision computing resources. In certain examples, the infrastructure template 130 may indicate multiple computing resources to be provisioned. A resource-workflow component 136 may be configured to determine whether the resource type indicated by the infrastructure template 130 is native to the service provider network 102. In examples where the resource type is native to the service provider network 102, the service provider network 102 may create an instance of the resource type native to the service provider network 102 for the user account 138 from which the request was received. In other examples where the infrastructure template 130 indicates the requested resource type is not native to the service provider 102, the resource-workflow component 136 may query the handler account 124 associated with the resource type. An execution component 128 may identify the resource handlers corresponding to the resource type and may execute the resource handlers to create an instance of the resource type of the computing resource. To do so, the resource handlers may execute and cause a resource component 144 associated with the resource provider account 148 to create an instance of the computing resource for the user account 138. The instance of the resource provider resource 150 may be provisioned to the user account 138 along with, in examples, the service provider network resources 140, when applicable.

In addition to the above, the handler account 124 may execute one or more of the resource handlers to generate logs and/or metrics associated with execution of the resource handlers. For example, a logs/metrics component 146 may be configured to generate one or more logs and/or metrics indicating performance of the resource handlers, including indications of successful execution, faulty execution, and/or contextual information associated with execution of the resource handlers, such as user accounts to which computing resources have been provisioned. The logs/metrics may be stored in association with the handler account 124 and/or the logs/metrics may be stored in association with the resource provider account 148. The resource provider may utilize the logs/metrics to update the resource handlers and/or for development of additional and/or different resource handlers.

Users may utilize the code-development interface 104 to describe computing resources and/or computing resource stacks in a text file or other type of descriptive representation (herein generally referred to as infrastructure templates 130). For instance, users may utilize a single console, software development kit, and/or other development interface provided by the host service provider network in order to create or define the infrastructure templates 130. Generally, the infrastructure templates 130 can describe the shapes of computing resources for different types of resources, and for different service provider networks. For example, the infrastructure templates 130 may be written in a human-readable language, and machine-readable language, such as JSON, XML, YAML, and so forth. The execution component 128 may create and configure computing resources that are described in the infrastructure templates 130 using one or more computing resource services provided by the service provider networks (e.g., storage service, compute service, database service, etc.). In some examples, the execution component 128 may be configured to determine, based at least in part on the text in the infrastructure template 130 that defines the shape of the computing resources, one or more API calls to make to computing resource services provided by the service provider networks to cause computing resources to be provisioned.

In some examples, service providers that manage service provider networks may offer infrastructure modeling services that provision computing resources on behalf of users. For instance, infrastructure modeling services may provision computing resources defined in an infrastructure template 130 by creating and configuring the resources using one or more computing resource services provided by the service provider network (for example, a hardware virtualization service to create compute instances, a database virtualization service to create database instances, and so forth). The use of infrastructure modeling services enables users to provision computing resource stacks in an automated and repeatable manner, relieving users from performing many manual actions or writing custom scripts to provision computing resource stacks in an automated fashion.

While infrastructure modeling services may be available for different service provider networks to allow users to model, provision, and operate computing resources in the service provider networks, users that have increased their cloud-based resource footprint to span across multiple service provider networks and/or that maintain their own computing resources utilize different provisioning/modeling tools. However, using multiple infrastructure modeling services or tools for performing the same types of tasks (model, provision, and operate cloud services) across different service provider networks may lead to document clutter, tool sprawl, automation silos that increase the complexity revolving around the use of different automated provisioning tools, and/or other inefficiencies.

The resource handlers utilized by the host service provider network 102 may additionally create and configure computing resources in other service provider networks managed by other service providers and/or computing resources associated with a resource publisher system. For example, a user that defines an infrastructure template 130 may indicate which service provider network and/or which system in which the infrastructure template 130 defines a computing resource to be provisioned. The resource-workflow component 136 of the service provider network may utilize the infrastructure templates 130 and cause a computing resource to be provisioned in one or more secondary service provider networks and/or resource publisher systems, such as by sending code to the resource provider account 148, calling APIs of the resource provider account 148, and/or any other means.

The registry service 106 may be an open, public registry that developers of resource handlers can use to store, publish, discover, and centrally manage resource handlers for different computing resource types, and for different service provider networks. The resource types may be stored in the registry service 106 in groupings with other resource handlers based on particular service provider networks and/or resource types for which the resource handlers were created. In some examples, the developers or users may mark or flag a resource type as public, such that other users may access and utilize the resource handlers, or private such that other users cannot access or use the resource handlers. The repository that maintains the registry service 106 may further store additional information along with the resource handlers, such as documentation, code samples, and/or other metadata (e.g., version number, dependencies, etc.) for the resource type.

In this way, developers of resource handlers may create an open-source library of resource handlers that are created or written in a common, unified meta schema or language format. However, rather than being specific to a particular service provider network, the resource handlers and/or resource types may be defined according to parameters specific to different service provider networks and/or systems that are supported by the host service provider network.

In some examples, the service provider network 102, as well as one or more secondary service provider networks and/or resource publisher systems, may comprise clusters of managed servers stored in data centers located across geographic areas. The service provider network 102 may be a distributed network through which users (often customers) may interact via user devices to utilize one or more computing resource services supported by various computing resources on a permanent or as-needed basis. For instance, the computing resources may be hardware, firmware, software, and/or any other type of resources that are supported by data centers, such as compute resources, for example, executing virtual machine (VM) instances and/or containers, executing batch jobs, executing code without provisioning servers), data/storage resources (for example, object storage, block-level storage, data archival storage), network-related resources (for example, configuring virtual networks including groups of compute resources, content delivery networks (CDNs), Domain Name Service (DNS)), application resources (for example, databases, application build/deployment services), and so forth. These and other computing resources may be provided as services, such as a hardware virtualization service that can execute server instances, a database virtualization service that can execute database instance, a storage virtualization service that can store data objects, and so forth.

The users (e.g., customers, developers, providers, etc.) of service provider network 102 may utilize one or more user accounts that are associated with a user and/or developer account, though these terms may be used somewhat interchangeably depending upon the context of use. Users may interact with a service provider network 102 across one or more intermediate networks (for example, the internet) via one or more development interface(s) 130, such as through use of application programming interface (API) calls, via a console implemented as a website or application, a software development kit (SDK), one or more command line interfaces (CLIs), and/or another interface. The interface(s) 130 may be part of, or serve as a front-end to, a control plane of the service provider network 102 that includes "backend" services supporting and enabling the services that may be more directly offered to customers.

To provide these and other computing resource services, service provider networks 102 often rely upon virtualization techniques. For example, virtualization technologies may be used to allow users to control or utilize server instances (for example, a VM using a guest operating system (O/S) that operates using a hypervisor that may or may not further operate on top of an underlying host O/S, a container that may or may not operate in a VM, an instance that can execute on "bare metal" hardware without an underlying hypervisor), where one or multiple server instances can be implemented using a single electronic device. Thus, a user may directly utilize a server instance hosted by the service provider network 102 to perform a variety of computing tasks, or may indirectly utilize a server instance by submitting code to be executed by the service provider network 102, which in turn utilizes a server instance to execute the code (typically without the user having any control of or knowledge of the underlying server instance(s) involved).

Depending on the type of service, each type or configuration of a computing resource may be available from the service provider network 102 in different sizes. For example, a service provider might offer physical hosts, VM instances or other types of data processing resources that are available for purchase and use that have many different configurations of processor capabilities, main memory, disk storage, and operating system. A service provider operating the service provider network 102 might also offer other types of resources for purchase and use by users. For example, a service provider might offer virtual or hardware devices, database resources and instances, file or block data storage resources, and/or networking resources, such as load balancing resources, domain name service ("DNS") resources, virtual private cloud ("VPC") resources, virtual local area network ("VLAN") resources, and/or other types of hardware and software computing resources or services on a permanent or as-needed basis. The resources might also include, but are not limited to, VM instances and images, security groups, option groups, gateways, option sets, network access control lists ("ACLs"), subnets, storage buckets, network interfaces, snapshots, spot market requests, and storage volumes.

The resources described above may be provided in one particular implementation by one or more data centers operated by the service provider. As known to those skilled in the art, data centers are facilities utilized to house and operate computer systems and associated components. Data centers also typically include redundant and backup power, communications, cooling, and security systems. The data centers might be located in geographically disparate regions, and might also be connected to various other facilities, such as co-location facilities, and various wide area networks ("WANs"), such as the Internet.

The resources described briefly above might also be provisioned and de-provisioned as needed in an automated fashion. For example, the service provider network 102 might be configured to instantiate a new instance of a computing resource, such as a VM instance, in response to an increase in demand for a network service or other condition. Other types of computing resources might also be provisioned and de-provisioned in a similar manner. Services in the service provider network 102 might also provide functionality for automatically scaling and/or de-scaling resources based upon demand for the resources and/or other factors.

Generally, the service provider network 102 may provide an infrastructure modeling service that allows users to describe a stack of computing resources in an infrastructure template 130, such as text file or other type of descriptive representation, and provisions the computing resource stacks in the service provider network 102 on behalf of the users. For instance, the infrastructure modeling service may include one or more provisioning engines to create and configure the resources using one or more computing resource services provided by the service provider network 102 (for example, a hardware virtualization service to create compute instances, a database virtualization service to create database instances, and so forth). In some examples, the provisioning engines may call one or more APIs that are exposed by the computing resource services in order to provision and configure the desired computing resources that are defined in the infrastructure templates 130. The use of an infrastructure modeling service enables users to provision computing resources in an automated and repeatable manner, relieving users from performing many manual actions or writing custom scripts to provision computing resource stacks in an automated fashion.

Generally, the user devices described herein as being utilized to surface the code-development interface 104 may be any type of computing device capable of connecting to the service provider network 102 via a suitable data communications network such as, but not limited to, a laptop or desktop computer, a tablet computing device, a server computer, or a mobile telephone. Administrative users employed by the operator of the service provider network 102, such as administrators managing the operation of the service provider network 102, might also connect with, manage, and utilize resources provided by the service provider network 102 in a similar fashion.

Figure 2:
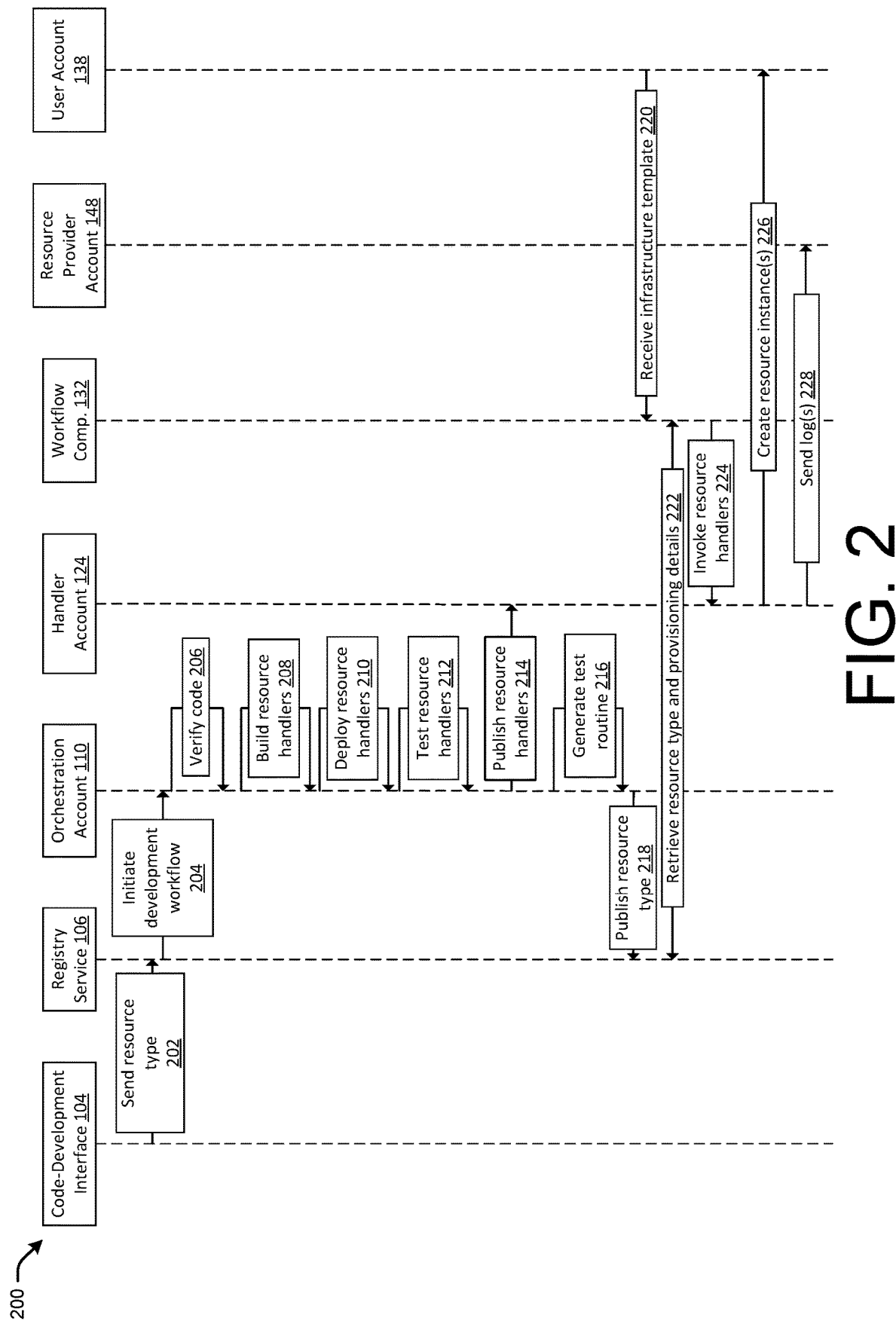
FIG. 2 illustrates a sequence diagram depicting an example sequence of operations for the testing and publishing of resource handlers in a cloud environment, including the execution of the resource handlers to create instances of computing resources.

FIG. 2 illustrates a sequence diagram 200 depicting an example sequence of operations for the testing and publishing of resource handlers in a cloud environment, including the use of the resource handlers to create instances of computing resources. It should be understood that while the sequence diagram 200 is described in a stepwise manner, some or all of the operations described with respect to FIG. 2 may be performed in a different order and/or in parallel.

At block 202, a code-development interface 104 may send a resource type of a computing resource for which resource handlers are to be developed to a registry service 106 of a service provider network 102. For example, a resource publisher may provide input to the code-development interface 104 that indicates a resource type associated with a given computing resource. The computing resource may be hosted by the resource publisher system and/or by a service provider network other than the service provider network associated with the code-development interface 104. In examples, the input may define infrastructure schemas for different resource types, such as new resource types, provided by the secondary service provider network and/or the resource publisher system. For example, the code-development interface may provide users with structured schemas, or "meta schemas," to create infrastructure templates using a structure/predefined format or syntax, but that are usable to provision and operate computing resources across a variety of different service provider networks and/or publisher systems. The schemas may define properties of the resource type of the computing resource, such as provisioning semantics. Further, the infrastructure schemas may be published or stored in an open provider registry, or an accessible repository, such that other users may access and share infrastructure schemas defining different resource types. In examples, the input may indicate the resource type and the infrastructure schemas may be generated and provided to the user via the code-development interface. In other examples, the input may include the infrastructure schemas.

Based at least in part on receiving input data indicating the resource type and/or the schemas, the service provider network may provide, utilizing the code-development interface 104, one or more scaffolds associated with the resource type. Scaffolding includes techniques wherein specifications for how an application database may be used are specified. A compiler or framework may utilize these specifications, together with pre-defined code templates, to generate code that the application may utilize to perform operations associated with database entries, such as creating, reading, updating, deleting, etc. The scaffolds may indicate where one or more functions are to be input to generate resource handlers associated with the resource type. The code-development interface 104 may utilize the functions as provided by the user to generate an artifact object associated with the resource type. Additionally, an indication of the resource type may be published to the registry service 106 of the service provider network.

At block 204, the registry service 106 may initiate a resource handler development workflow with an orchestration account 110. The resource handler development workflow may include step functions to be performed for building, testing, and publishing resource handlers.

At block 206, a verification component associated with the orchestration account 110 may verify that code and/or other information generated utilizing the code-development interface 104 satisfies a static code analysis. For example, during the managed provider runtime, a verification component may receive an indication from the registry service that a resource type has been developed utilizing the code-development interface. The verification component may perform a static code analysis of the artifact to determine whether one or more security constraints are met and/or that one or more security policies are not violated by the artifact. For example, if the artifact includes one or more embedded secrets or information that may create a security risk to the publisher, the verification component may return results indicating that the artifact as generated utilizing the code-development interface did not satisfy the static code analysis. A notification of the results may be generated and may be displayed, such as using the code-development interface, to allow the user to be informed of the error and to take corrective action, if desired.

At block 208, a build component associated with the orchestration account 110 may build the resource handlers utilizing the code and/or information generated using the code-development interface 104. For example, in instances where the verification component determines that the artifact satisfies the static code analysis, a build component may be configured to generate one or more resource handlers utilizing the artifact. Generation of the resource handlers may include the generation of code that, when executed, results in an instance of the type of the computing resource being created. The resource handlers may allow for one or more functionalities associated with the computing resource to be performed. For example, the resource handlers may be utilized to create an instance of the computing resource, to duplicate an instance of the computing resource, to read an instance of the computing resource and/or data associated with the computing resource, to list information associated with the computing resource, to delete an instance of the computing resource, to perform one or more check operations associated with the computing resource, to update the computing resource, and/or to perform one or more operations on the computing resource.

At block 210, a deployment component associated with the orchestration account 110 may deploy the resource handlers to a test platform for performance of execution tests on the resource handlers. For example, a deployment component may be utilized, once the resource handlers are built by the build component, to publish the resource handlers in association with a test platform associated with the orchestration account. The test platform may be configured to allow for the testing of execution of resource handlers prior to publishing the resource handlers for use outside a testing environment. The test platform may be configured to allow for the resource handlers to be called to perform the one or more functionalities described herein. The test platform may be configured such that execution of the resource handlers on the test platform does not impact the service provider network (other than the test platform).

At block 212, a testing component associated with the orchestration account 110 may perform the one or more execution tests on the resource handlers to determine whether execution of the resource handlers results in successful creation of an instance of the computing resource, for example. In examples, the testing component may be utilized to perform one or more execution tests when executing the resource handlers on the test platform. The execution tests may include testing the resource handler's ability to perform the one or more functions associated with the computing resource, such as the ability to create, delete, read, list, update, and/or operate an instance of the computing resource, for example. The execution tests may be predetermined by the service provider network and may be based at least in part on the resource type of the computing resource, one or more parameters associated with the schema and/or functions provided during artifact generation, one or more attributes of the service provider network and/or resource publisher system hosting the computing resource. The execution tests may also include schema validation, which may include validating definitions and/or syntax associated with the resource handlers. Doing so may ensure that naming conventions and/or code structure of the resource handlers complies with one or more rules and/or guidelines associated with the service provider network. In examples, the execution tests may include perform multiple instances of the same test to determine that execution of the resource handlers is likely to produce repeatable successful results. In these examples, one or more variables associated with the execution tests may be modified to determine if any of those variables impact the successful execution of the resource handlers. In these and other examples, a percentage of successful executions, or similar metrics indicating a likelihood of successful execution, may be generated and utilized to determine whether execution of a given resource handler satisfies the execution tests. Additionally, or alternatively, the publisher may provide input on the execution tests, such as via the code-development interface. For example, the publisher may request that one or more additional execution tests by performed. These user-designated tests may be validated and added to the execution tests to be performed by the testing component.

At block 214, a publishing component associated with the orchestration account 110 may publish the resource handlers to a handler account 124 for use by the service provider network 102 when requested. In examples where the execution tests indicate successful execution of the resource handlers, a publishing component 120 may be utilized to publish the resource type of the computing resource to the registry service 106. Once published to the registry service 106, the resource type may be available for the publisher and/or other users to utilize for creating the computing resource. The publishing component may also be configured to provide the resource handlers and/or data associated with the resource handlers to a resource-type indicator of a handler account 124. The resource-type indicator 126 may be utilized during a workflow runtime to identify and/or utilize the resource handlers.

At block 216, a test-routine component associated with the orchestration account 110 may generate one or more test routines for testing execution of the resource handlers over time. For example, the test-routine component of the orchestration account 110 may be configured to generate one or more test routines associated with execution of the resource handlers. For example, periodic and/or scheduled execution tests may be performed in association with the resource handlers to ensure that execution of the resource handlers continues to be successful, such as in instances where one or more modifications to the computing resource, the resource provider account, the service provider network, and/or one or more other computing resources occurs. The test-routine component may also be utilized to determine which version of given resource handlers should be executable. For example, a first version indicator of first resource handlers may be stored in association with the resource provider account. Thereafter, second resource handlers associated with the computing resource or another computing resource may be generated and utilized, and a second version identifier of the second resource handlers may be stored in association with the resource provider account. However, during scheduled execution testing, the test-routine component may determine that a number of faults associated with execution of the second resource handlers satisfies a threshold number of faults, and/or that a particular type of fault has occurred. In these examples, the service provider network may determine that the second resource handlers are no longer successfully executing, and the resource type associated with the second resource handlers may be removed from the registry service such that the resource type associated with the first resource handlers remains.

At block 218, the orchestration account 110 may publish the resource type to the registry service 106 and/or may cause the registry service 106 to indicate that the resource type 106 is valid and available for use to provision the computing resource to user accounts.

At block 220, a user associated with a user account 138 may provide and/or generate an infrastructure template defining configuration data for creating an instance of the resource type. For example, the infrastructure template may be sent to a workflow component 132, which may initiate provisioning of the resource type to the user account. To do so, the user may provide input to a provisioning interface configured to display a GUI associated with creating and provisioning computing resources. The GUI may allow for input associated with an infrastructure template that defines configuration data for creating the resource type of the computing resource. The infrastructure template may allow the user to provide an indication of the resource type as well as associated information about the requested creation of an instance of the computing resource. The associated information may include authentication information. For example, during development of the resource handlers, the publisher may provide input indicating that one or more access restrictions to the resource type are to be implemented. The access restrictions may include allowing for only certain user accounts to utilize the resource type, allow for only user accounts that provide correct authentication information to utilize the resource type, etc. This information may be stored in association with the resource handlers and the access restrictions may be applied when the infrastructure template is received. Additionally, one or more usage restrictions may be applied to the resource type, such as an amount of usage of the computing resource and/or a type of usage, such as a geographic region for requested usage. For example, the service provider network may allow for provisioning of computing resource across multiple geographic regions having multiple data centers. Some or all of the data centers may be configured to execute the resource handlers in a unique manner and/or some of the data centers may not be configured to execute the resource handlers. The infrastructure template may indicate the data centers and/or geographic region where execution of the resource handlers is to be performed, and when that indication corresponds to permitted use of the resource handlers, execution of the resource handlers may be permitted.

At block 222, the workflow component 132 may identify the resource type from the infrastructure template and may retrieve the resource type and provisioning details, if available, from the registry service 106. For example, once any access restrictions are satisfied, the registry service may be called to determine which resource types are associated with a request to provision computing resources. In certain examples, the infrastructure template may indicate multiple computing resources to be provisioned. The resource-workflow component 132 may be configured to determine whether the resource type indicated by the infrastructure template is native to the service provider network or another network and/or system. In examples where the resource type is native to the service provider network, the service provider network may create an instance of the resource type native to the service provider network for the user account from which the request was received. In other examples where the infrastructure template indicates the requested resource type is not native to the service provider, the resource-workflow component 132 may query the handler account 124 associated with the resource type.

At block 224, the workflow component 132 may communicate with the handler account 124 to invoke or otherwise execute the resource handlers. For example, the handler account 124 may identify the resource handlers corresponding to the resource type and may execute the resource handlers to create an instance of the resource type of the computing resource. To do so, the resource handlers may execute to interact with the resource provider account to create an instance of the computing resource for the user account.

At block 226, the handler account 124 may cause the resource handlers to execute to create an instance of the computing resource corresponding to the resource type. In examples, the handler account 124 may communicate with a resource provider account 148 to cause the resource provider account 148 to create the instance of the computing resource. The instance of the computing resource may be provisioned to the user account along with, in examples, the service provider network resources, when applicable.

At block 228, the handler account 124 may generate logs and/or metrics associated with execution of the resource handlers. The logs and/or metrics may be sent to the resource provider account 148 for use by the resource provider. In addition to the above, the handler account may execute one or more of the resource handlers to generate logs and/or metrics associated with execution of the resource handlers. For example, a logs/metrics component may be configured to generate one or more logs and/or metrics indicating performance of the resource handlers, including indications of successful execution, faulty execution, and/or contextual information associated with execution of the resource handlers, such as user accounts to which computing resources have been provisioned. The logs/metrics may be stored in association with the handler account and/or the logs/metrics may be stored in association with the resource provider account. The resource provider may utilize the logs/metrics to update the resource handlers and/or for development of additional and/or different resource handlers.

Figure 3:
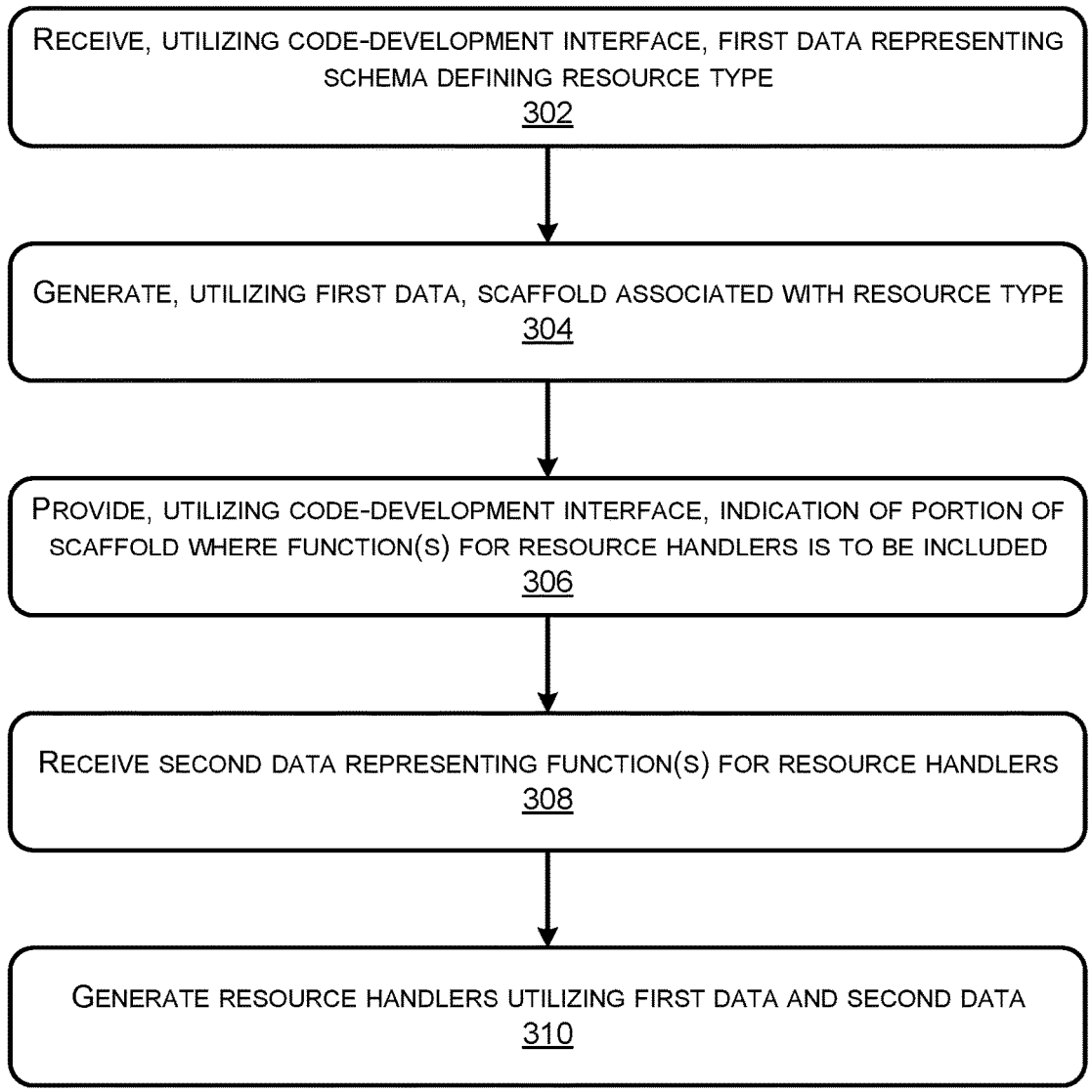
FIG. 3 illustrates a flow diagram of an example method for generation of resource handlers utilizing a code-development interface.

FIG. 3 illustrates processes for generation of resource handlers utilizing a code-development interface. The processes described herein are illustrated as collections of blocks in logical flow diagrams, which represent a sequence of operations, some or all of which may be implemented in hardware, software or a combination thereof. In the context of software, the blocks may represent computer-executable instructions stored on one or more computer-readable media that, when executed by one or more processors, program the processors to perform the recited operations. Generally, computer-executable instructions include routines, programs, objects, components, data structures and the like that perform particular functions or implement particular data types. The order in which the blocks are described should not be construed as a limitation, unless specifically noted. Any number of the described blocks may be combined in any order and/or in parallel to implement the process, or alternative processes, and not all of the blocks need be executed. For discussion purposes, the processes are described with reference to the environments, architectures and systems described in the examples herein, such as, for example those described with respect to FIGS. 1, 2, and 4-13, although the processes may be implemented in a wide variety of other environments, architectures and systems.

FIG. 3 illustrates a flow diagram of an example process 300 for generation of resource handlers utilizing a code-development interface. The order in which the operations or steps are described is not intended to be construed as a limitation, and any number of the described operations may be combined in any order and/or in parallel to implement process 300.

At block 302, the process 300 may include receiving, utilizing a code-development interface, first data representing a schema defining a resource type of a computing resource. In examples, the input may define infrastructure schemas for different resource types, such as new resource types, provided by the secondary service provider network and/or the resource publisher system. For example, the code-development interface may provide users with structured schemas, or "meta schemas," to create infrastructure templates using a structure/predefined format or syntax, but that are usable to provision and operate computing resources across a variety of different service provider networks and/or publisher systems. The schemas may define properties of the resource type of the computing resource, such as provisioning semantics. Further, the infrastructure schemas may be published or stored in an open provider registry, or an accessible repository, such that other users may access and share infrastructure schemas defining different resource types. In examples, the input may indicate the resource type and the infrastructure schemas may be generated and provided to the user via the code-development interface. In other examples, the input may include the infrastructure schemas.

At block 304, the process 300 may include generating, based at least in part on the first data, a scaffold associated with the resource type. For example, based at least in part on receiving input data indicating the resource type and/or the schemas, the service provider network may provide, utilizing the code-development interface, one or more scaffolds associated with the resource type. Scaffolding includes techniques wherein specifications for how an application database may be used are specified. A compiler or framework may utilize these specifications, together with pre-defined code templates, to generate code that the application may utilize to perform operations associated with database entries, such as creating, reading, updating, deleting, etc.

At block 306, the process 300 may include providing, utilizing the code-development interface, and indication of a portion of the scaffold where one or more functions for resource handlers is to be included. The functions may represent parameters or other information specific to the resource type at issue and/or information that is important for performing operations associated with the computing resource, such as resource location information, security information, restrictions on use of the computing resource, etc.

At block 308, the process 300 may include receiving second data representing the one or more functions for the resource handlers. The functions may be received via input by the publisher to the code-development interface as discussed herein.

At block 310, the process 300 may include generating the resource handlers utilizing at least one of the first data or the second data. In examples, the code-development interface may utilize the functions as provided by the user to generate an artifact object associated with the resource type. Additionally, an indication of the resource type may be published to a registry service of the service provider network. Components of an orchestration account, as described in more detail elsewhere herein, may be utilized to validate the artifact object, build the resource handlers, and perform execution tests on the resource handlers prior to publishing the resource type to the registry service for use by one or more user accounts.

The process 300 described above may be utilized by a host service provider network (or other computing platform), which may provide a centralized management service that supports an open source framework allowing users, or developers, to use the code-development interface to manage computing resources and services for multiple service provider networks and/or systems. In some examples, users may create infrastructure schemas using the code-development interface to model different resource types for any of the different service provider networks and/or systems. For example, the code-development interface may allow users to write, or otherwise create, the infrastructure schemas in a unified meta schema or language format. The meta schema or language format used to create infrastructure schemas may be a text-based description of a computing resource stack that is machine-readable and also human-readable. The meta schema may be a language that is uniquely created or managed by the host service provider network, or a known language format such as JSON, YAML, XML, plain text, and/or other computer-readable and human-readable languages. However, it may be difficult for users to create valid, and usable infrastructure schemas from scratch, and/or by viewing sample infrastructure schemas.

For example, developers of the host service provider network, developers of the secondary service provider network, and/or public domain developers, may create meta schemas that restrict and control how a user defines the shape of a computing resource such that a user who wishes to create an infrastructure template using an infrastructure schema may provide inputs that are compliant with the infrastructure schema. As an example, a developer may create a JSON schema for provisioning a database instance in a secondary service provider network. The JSON schema may define parameters that restrict and control what inputs a user can provide for parameters of the database instance. For instance, the JSON schema may include read-only fields that contain parameters or definitions that are necessary to properly implement the database instance in the secondary service provider network (e.g., API call(s), memory locations, etc.). However, the JSON schema may include write fields in which users may provide user-definable parameters for their desired infrastructure template. For instance, the user may be allowed to input a name of the database instance, a size (e.g., rows and columns) for the database instance, an amount of compute power allocated for the database instance, an amount of memory to allocate for the database instance, and so forth.

Accordingly, if a user desires to create a particular infrastructure template, the user may indicate the type of resource and/or service provider network for which they would like to create the infrastructure template, and receive a sample schema, or infrastructure schema, for that resource type and/or service provider network. Additionally, the infrastructure schema may restrict or control the types of inputs the user provides as parameters to help ensure that the resulting code that is generated from the infrastructure schema is compliant for that resource type and/or service provider network. In some examples, the code-development interface that provides the infrastructure schemas may allow for testing and/or debugging of the code that is created using the infrastructure schemas. For instance, the code-development interface may provide errors that indicate improper parameters for the resource type and/or service provider network for which the resulting infrastructure template is to be used for provisioning the computing resource. Once the user has created a valid infrastructure template using the infrastructure schema, the code-development interface and/or the service provider network may generate the final code, and an execution component of a handler account may provision the computing resource described in the infrastructure template in the selected host service provider network or the appropriate secondary service provider network.

In some examples, the code-development interface may comprise an open-source toolkit (or other interface(s) such as a CLI, API, etc.) that allows users to create and test computing resource types for different service provider networks using a common language format. Upon receiving a request from a user to initialize a workspace to create an infrastructure schema for a computing resource type, the code-development interface may request that the user provide input that indicates which of the supported service provider networks for which the user is creating an infrastructure schema, and also indicates a type of the computing resource that the user is creating (e.g., compute resource, data/storage resource, network-related resource, application resource, etc.). The code-development interface may allow the user to start creating a text file (or infrastructure schema) that describes the properties and shape of the described resource.

As noted above, the code-development interface may provide structured infrastructure schemas based on the desired resource type and/or service provider network. The infrastructure schemas may be compliant with the meta schema and illustrate different ways the user may define the resource type. In some examples, the infrastructure schemas may include definable fields the user can write into to define and/or customer parameters or properties of the cloud resource. Additionally, or alternatively, the sample template may include read-only fields or portions that are specific or required to provision the desired resource and/or for the indicated service provider network. For example, if a user is creating an infrastructure template for a database resource type, the sample template may include user-definable fields where the user can specify parameters of the database resource, such as a name of the database, how much memory is reserved for the database resource/instance, an amount of compute or processing power, and/or other parameters. The read-only fields may include information such as API calls for provisioning the database resource in a particular service provider network, parameters for properly defining the database resource in memory, and so forth. In this way, a user may create an infrastructure template using a common meta schema language for different resource types and/or for different service provider networks.

Once the user has finished creating the infrastructure template, the user may request that the code-development interface generate source code based on the description in infrastructure template for review and/or testing. For instance, the infrastructure template may be validated against an infrastructure schema for the desired computing resource. The code-development interface (or another service managed by the host service provider network) may generate source code for the final infrastructure template, or otherwise generate source code according to the filled-out infrastructure schema. Generally, the infrastructure template may be used to generate source code that is appropriate for, or used by, the desired service provider network. For instance, the different service provider networks may provision computing resources using different types of source code or other computer-readable instructions. In such examples, the infrastructure schema may be utilized to generate the code in a format that is utilized by the desired service provider network. Further, the user may edit the source code, if desired, to fix bugs and/or include source code that is known to the user and/or wanted by the user to be included for their computing resource instance. Additionally, the code-development interface may provide various tests to ensure that the code is built to conform to the consistent interface, and for debugging purposes by the user. The user can modify the infrastructure template and/or code based on the testing until the infrastructure template is ready for use in provisioning the particular computing resource type.

FIG. 4 illustrates an example code-development interface 400, such as a graphic user interface (GUI), for receiving input to generate resource handlers.

As illustrated, the interface 400 may comprise a developer interface, such as an interface supported by or the same as the code-development interface 104. The developer interface 400 may be a website, console, SDK, and/or any other type of interface at least partly supported by the service provider network 102. The developer interface 400 may enable a user to create an infrastructure schema for defining a computing resource in one or more service provider networks 102 and/or resource publisher systems.

As illustrated, the developer interface 400 may include a resource list 404 that displays a list of computing resources (e.g., stacks) defined for one or more service provider networks 102 and/or resource publisher systems. The resource list 404 may indicate a logical ID, resource type, status, description, and also the service provider network 102 and/or resource publisher system for the resource. Additionally, one or more selectable interface elements are displayed, such as a selectable interface element that can be used to initiate designing a template 130, and also an interface element for designing a schema (e.g., resource type) for a computing resource.

In examples, the resource type list 404 displays a list of computing types (e.g., schemas) that may, for example, be associated with a user account. As shown, each entry in the list includes various information about a particular computing resource schema such as, for example, a name of the computing resource, an indication of the status of the computing schema (for example, indicating whether the schema is currently being created, creation of the schema has completed successfully, creation of the schema failed, and so forth), an indication of the service provider network 102 and/or resource publisher system of the computing resource, and possibly other information about the schema.

In examples, computing resource details include more detailed information about a selected computing resource from the computing resource list 404. For example, a user may provide input selecting one of the computing resources in the list 404 and the interface 400 can display additional detailed information including overview information, a list of the computing resources included in the corresponding computing resource stack, event information associated with the computing resource, information about a corresponding infrastructure schema that was used to define the computing resource, among other related information.

In an example, the interface 400 may include a resource type interface 406 that presents an infrastructure schema for the indicated computing resource and/or service provider network 102 and/or resource publisher system. As illustrated, a portion of the schema for a message queue may be presented in the schema interface 406 to allow a user to define an infrastructure schema defining a computing resource of a particular type, and in a particular service provider network 102 and/or resource publisher system. In some examples, the schema may include an indication of the type of the resource (e.g., queue), the service provider network 102 and/or resource publisher system in which the resource is to be provisioned, and properties or parameters for the computing resource. The resource type interface 406 may present the schema which, in this example, is a JSON schema. As shown, the schema may restrict or control the input of the user by defining that the input must be of a "type" that is a "resource" meaning that input from the user must be of the certain type. Additionally, the schema may provide annotations, or hints, at the types of input the user is to input into the fields.

If the user does not provide the correct input that corresponds to the defined "type" for example, then an error message may be provided when the user attempts to create an infrastructure schema. In this way, the schemas may be utilized to help users provide appropriate input to define infrastructure templates 130 that will cause the desired resources and/or services to be provisioned in the appropriate service provider network 102 and/or resource publisher system.

This is simply one example of a schema for a resource type, such as a message queue, but the techniques are equally applicable for any resource type, for any service provider network 102 and/or resource publisher system, and for any type of schema language. After defining the infrastructure schema, the developer may publish the schema defining the computing resource to the registry 106.

Figure 5:
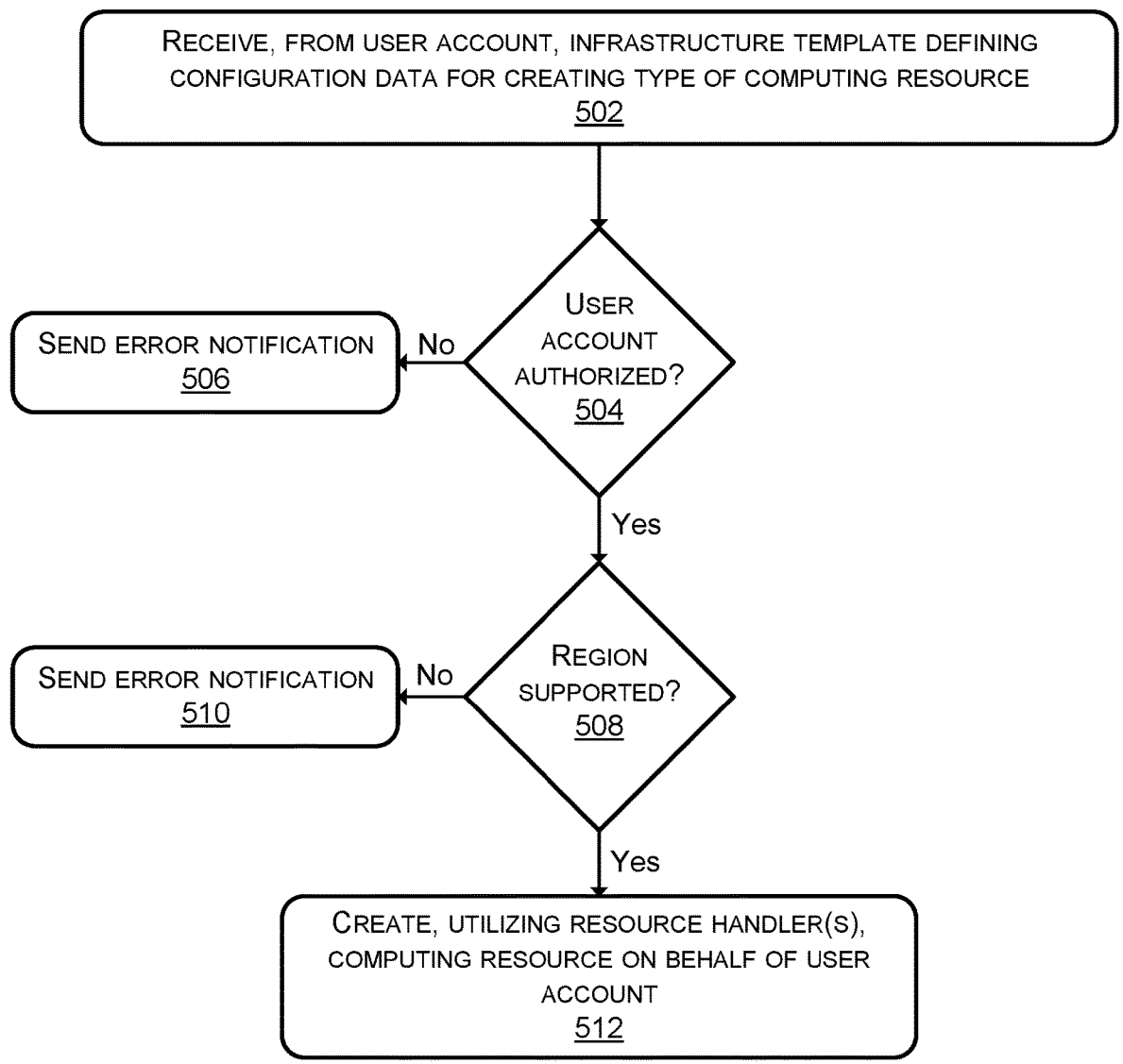
FIG. 5 illustrates a flow diagram of an example method for creating and provisioning computing resources utilizing resource handlers.
Figure 6:
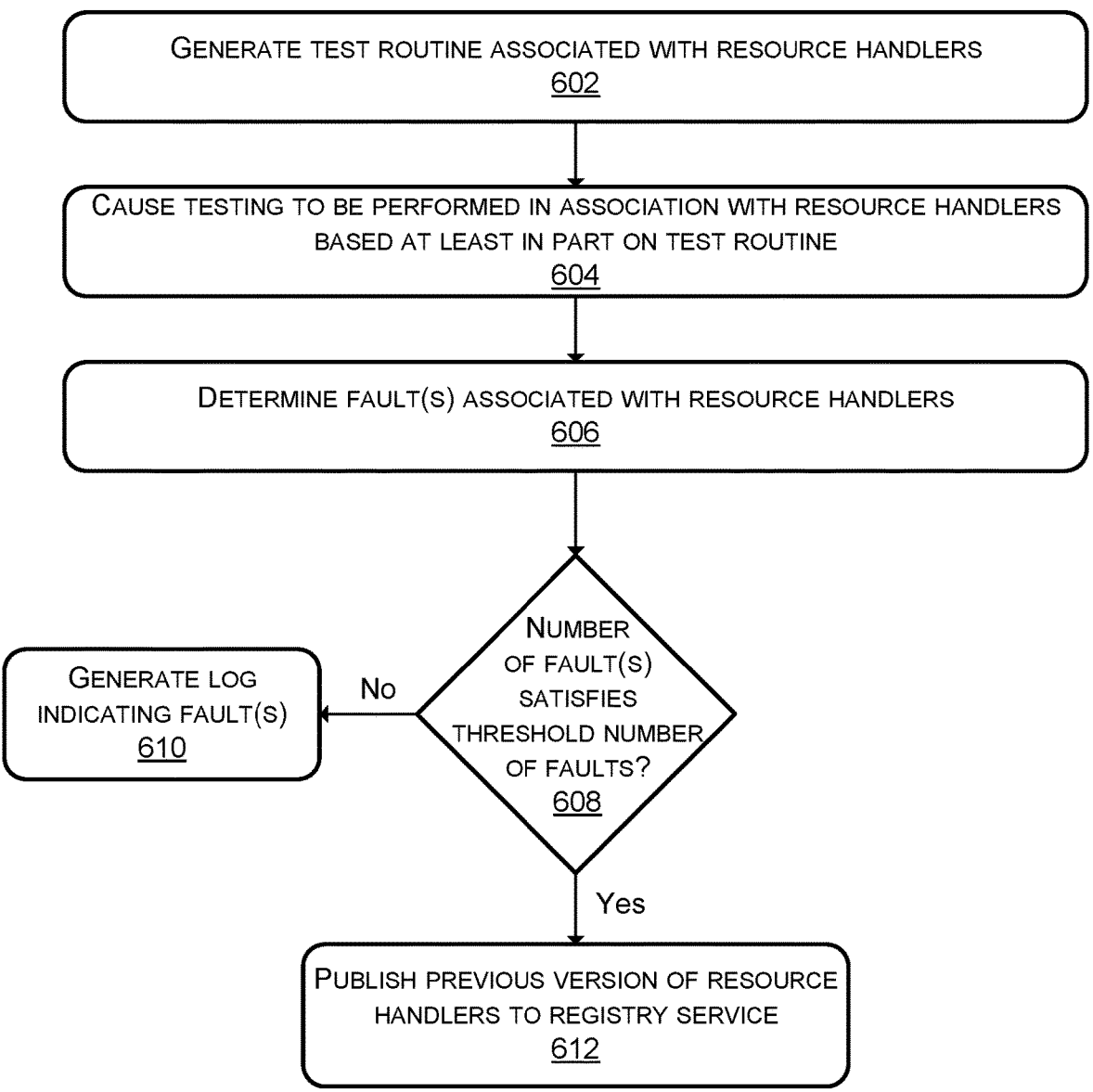
FIG. 6 illustrates a flow diagram of an example method for generating and use of a testing routine associated with execution of resource handlers.

FIGS. 5 and 6 illustrate processes associated with testing and use of resource handlers. The processes described herein are illustrated as collections of blocks in logical flow diagrams, which represent a sequence of operations, some or all of which may be implemented in hardware, software or a combination thereof. In the context of software, the blocks may represent computer-executable instructions stored on one or more computer-readable media that, when executed by one or more processors, program the processors to perform the recited operations. Generally, computer-executable instructions include routines, programs, objects, components, data structures and the like that perform particular functions or implement particular data types. The order in which the blocks are described should not be construed as a limitation, unless specifically noted. Any number of the described blocks may be combined in any order and/or in parallel to implement the process, or alternative processes, and not all of the blocks need be executed. For discussion purposes, the processes are described with reference to the environments, architectures and systems described in the examples herein, such as, for example those described with respect to FIGS. 1-4 and 7-13, although the processes may be implemented in a wide variety of other environments, architectures and systems.

FIG. 5 illustrates a flow diagram of an example process 500 for creating and provisioning computing resources utilizing resource handlers. The order in which the operations or steps are described is not intended to be construed as a limitation, and any number of the described operations may be combined in any order and/or in parallel to implement process 500.

At block 502, the process 500 may include receiving, from a user account, an infrastructure template defining configuration data for creating a type of computing resource. In examples, a console view of an infrastructure modeling service may include selectable options, including registry selection, that allows a user to navigate features of the infrastructure modeling service. Upon selecting the register selection, the user may be provided with a registry interface for the registry. The user may be allowed to search resource types, and restrict the search based on various parameters (e.g., resource types published by the user, shared with the user, shared for the host service provider network, shared for secondary user provider network(s) and/or resource publisher systems, etc.). The user may be able to select a particular field indicating a resource type, such as resource type—compute instance or resource type—database instance.

The registry interface may present a GUI including resource type specifications for the resource type. The specification may include various data or metadata for the resource type of the schema stored in the registry 106, such as who it was shared by, a source or location of the resource type, readme information, resources, inputs, examples, license information, etc. In this way, a user may consume the resource type, or schema, using the registry interface. The user may then use this information to create an infrastructure template 130 that is valid according to the schema for the resource type.

At block 504, the process 500 may include determining whether the user account from which the infrastructure template was received is an authorized user account. For example, during development of the resource handlers, the publisher may provide input indicating that one or more access restrictions to the resource type are to be implemented. The access restrictions may include allowing for only certain user accounts to utilize the resource type, allow for only user accounts that provide correct authentication information to utilize the resource type, etc. This information may be stored in association with the resource handlers and the access restrictions may be applied when the infrastructure template is received.

If the user account is not authorized, then the process 500 may continue to block 506 where an error notification may be sent to a computing device associated with the user account. The error notification may indicate that the resource type is not available based at least in part on the access restrictions.

If the user account is authorized, then the process 500 may continue to block 508 where the process 500 may include determining whether a region indicated by the infrastructure template is supported. For example, one or more usage restrictions may be applied to the resource type, such as an amount of usage of the computing resource and/or a type of usage and/or a geographic region for requested usage. For example, the service provider network may allow for provisioning of computing resource across multiple geographic regions having multiple data centers. Some or all of the data centers may be configured to execute the resource handlers in a unique manner and/or some of the data centers may not be configured to execute the resource handlers. The infrastructure template may indicate the data centers and/or geographic region where execution of the resource handlers is to be performed, and when that indication corresponds to permitted use of the resource handlers, execution of the resource handlers may be permitted.

If the region indicated by the infrastructure template is not supported, then the process 500 may continue to block 510 where an error notification may be sent to the computing device associated with the user account. The error notification may indicate that the resource type is not supported for use in the region indicated in and/or associated with the infrastructure template.

If the region indicated by the infrastructure template is supported, then at block 512 the process 500 may include creating, utilizing the resource handlers, an instance of the computing resource on behalf of the user account. In examples, a handler account may communicate with a resource provider account to cause the resource provider account to create the instance of the computing resource. The instance of the computing resource may be provisioned to the user account along with, in examples, the service provider network resources, when applicable.

FIG. 6 illustrates a flow diagram of an example process 600 for generating and use of a testing routine associated with execution of resource handlers. The order in which the operations or steps are described is not intended to be construed as a limitation, and any number of the described operations may be combined in any order and/or in parallel to implement process 600.

At block 602, the process 600 may include generating a test routine associated with one or more resource handlers. For example, a test-routine component may be configured to generate one or more test routines associated with execution of the resource handlers. For example, periodic and/or scheduled execution tests may be performed in association with the resource handlers to ensure that execution of the resource handlers continues to be successful, such as in instances where one or more modifications to the computing resource, the resource provider account, the service provider network, and/or one or more other computing resources occurs.

At block 604, the process 600 may include causing testing to be performed in association with the resource handlers based at least in part on the test routine. For example the resource handlers may be executed, such as on a test platform, to determine whether the resource handlers executed properly.

At block 606, the process 600 may include determining one or more faults associated with execution of the resource handlers. For example, during scheduled execution testing, the test-routine component may determine a number of faults associated with execution of the resource handlers and/or that a particular type of fault has occurred. In these examples, the service provider network may determine that the second resource handlers are no longer successfully executing, and the resource type associated with the second resource handlers may be removed from the registry service such that the resource type associated with the first resource handlers remains.

At block 608, the process 600 may include determining whether the number of faults satisfies a threshold number of faults and/or if the faults are of a predefined fault type. For example, a threshold number of faults may be predetermined based at least in part on the resource type, preferences set by the service provider network, and/or preferences set by the publisher. Additionally, predefined fault types representing more serious faults may be predetermined based at least in part on the resource type, the resource handlers at issue, and/or preferences set by the service provider network and/or the publisher.

If the number of faults does not satisfy the threshold number of faults, the process 600 may continue to block 610 where one or more logs may be generated that indicate the faults. The logs may be stored in association with the service provider network and/or the logs may be sent to the resource publisher account to provide indications of the faults to the publisher for corrective action.

If the number of faults satisfies the threshold number of faults, then at block 612 the process 600 may include publishing a previous version of the resource handlers to the registry service in place of the current resource handlers. For example, the test-routine component may also be utilized to determine which version of given resource handlers should be executable. For example, a first version indicator of first resource handlers may be stored in association with the resource provider account. Thereafter, second resource handlers associated with the computing resource or another computing resource may be generated and utilized, and a second version identifier of the second resource handlers may be stored in association with the resource provider account. If faults associated with the second resource handlers satisfy the threshold number of faults and/or correspond to the predefined fault types, the first resource handlers and/or resource type indicator may be published to the registry instead of the second resource handlers and/or second resource type.

Figure 7:
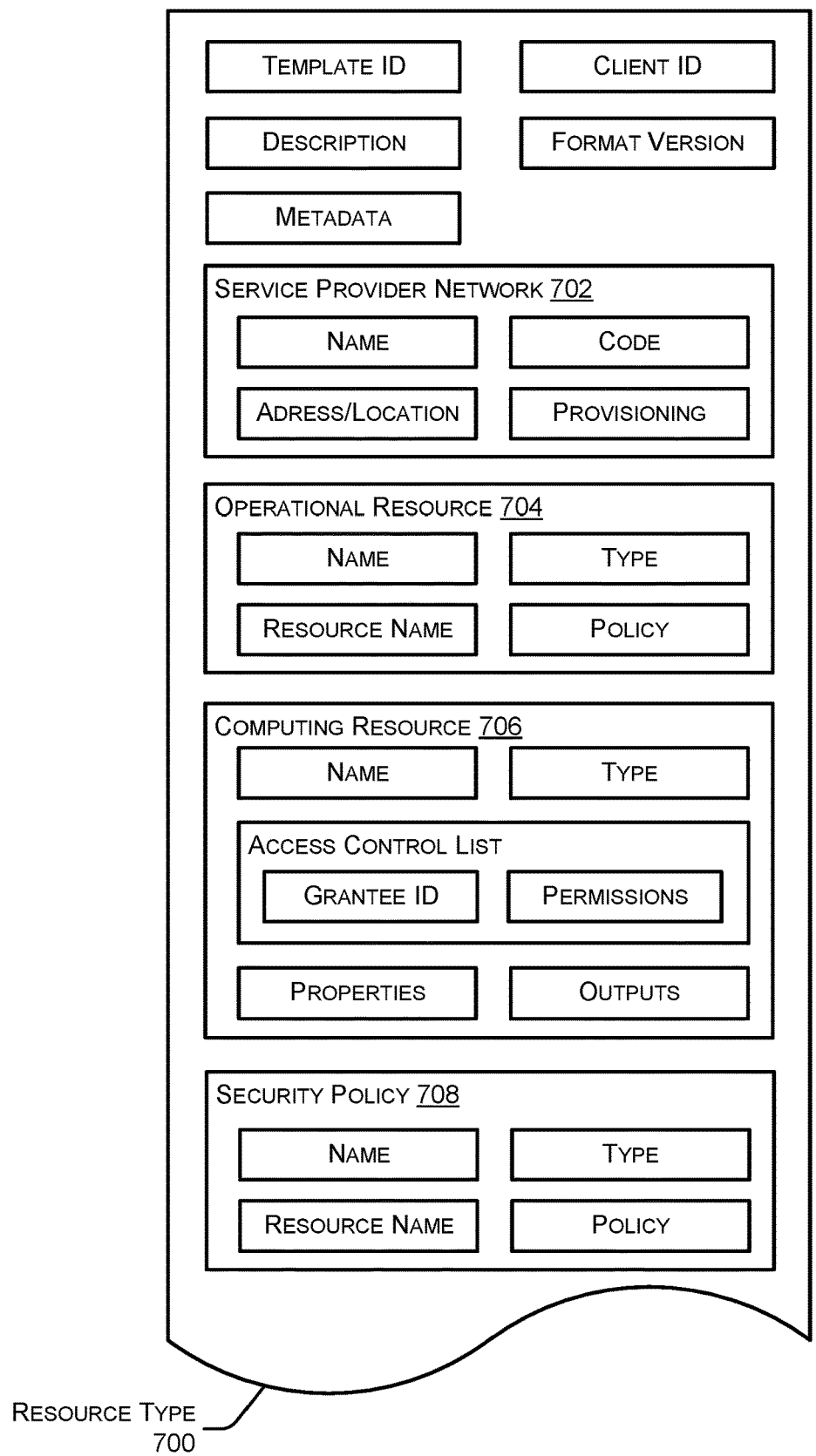
FIG. 7 illustrates an example diagram of a resource type that can be consumed to create an infrastructure template to provision and deploy computing resources.

FIG. 7 illustrates an example diagram of a resource type 700 that can be consumed by a user to create an infrastructure template to provision and deploy computing resources.

The resource type 700 may represent configuration data for provisioning a computing resource. A template may have more or less information than the illustrated resource type 700, but the following description provides some examples of resources that can be defined and launched using a resource type 700. A resource type 700 may include header information such as a template identifier, a user identifier for the user (i.e., client) who owns the template, and one or more fields containing descriptive information such as versioning and text describing what the resource type 700 is used for. One or more definitions 702, 704, 706, and 708 may be included in the resource type 700, and each may provide parameters to be included in the configuration of resources created and/or defined from the resource type 700. Non-limiting examples of resource definitions include: a service provider network and/or system 702 including a name, an address/location of the service provider network for which the resource type 700 is created, code, and provisioning data; an operational resource definition 704 including a name, a resource type (e.g., logical container; group scaling policy), and an access policy; a computing resource definition 706 including a name for identifying virtual resource instances launched from the definition 706, a resource type (e.g., virtual machine, data store, message queue, etc.), one or more access control lists or other security sub-policies identifying one or more users and the access permissions they are granted, and one or more properties of the corresponding virtual resource instance; and, a security policy definition 708 including a policy name, policy type, the name of the computing resource the security policy attaches to, and the security policy itself or a reference (e.g., file name) thereto.

The service provider network 102 as described above may be configured to create and configure virtual resource instances from the definitions defined according to the resource type 700. In one example, a resource allocation system may read a computing resource definition 706 for a virtual machine to determine the type and amount of physical and/or virtual resources to allocate for an instance of the virtual machine. This information may be determined from the properties of the definition 706, such as a virtual machine image file or a plurality of parameters identifying the file system, operating system, runtime environment, number and composition of containers, software program(s) to execute, and the like. The properties may also identify how an associated instance should be connected to the virtual network and/or configured as an endpoint connected to an external communication network. In another example, the resource allocation system may read a security policy definition 708 to create a security policy and attach the security policy to the example virtual machine instance.

Figure 8:
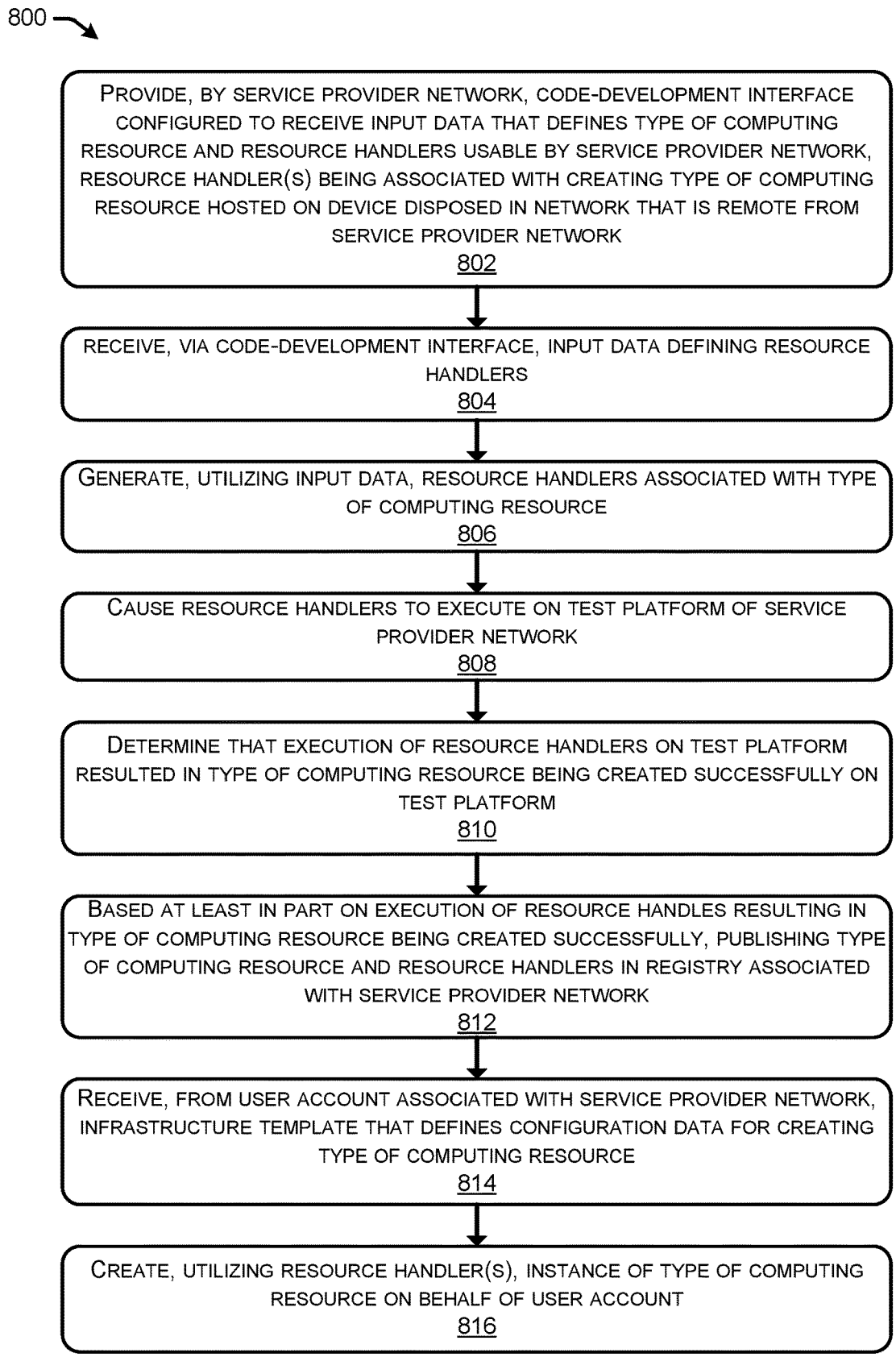
FIG. 8 illustrates a flow diagram of an example method for testing, publishing, and utilizing resource handlers in a cloud environment.
Figure 9:
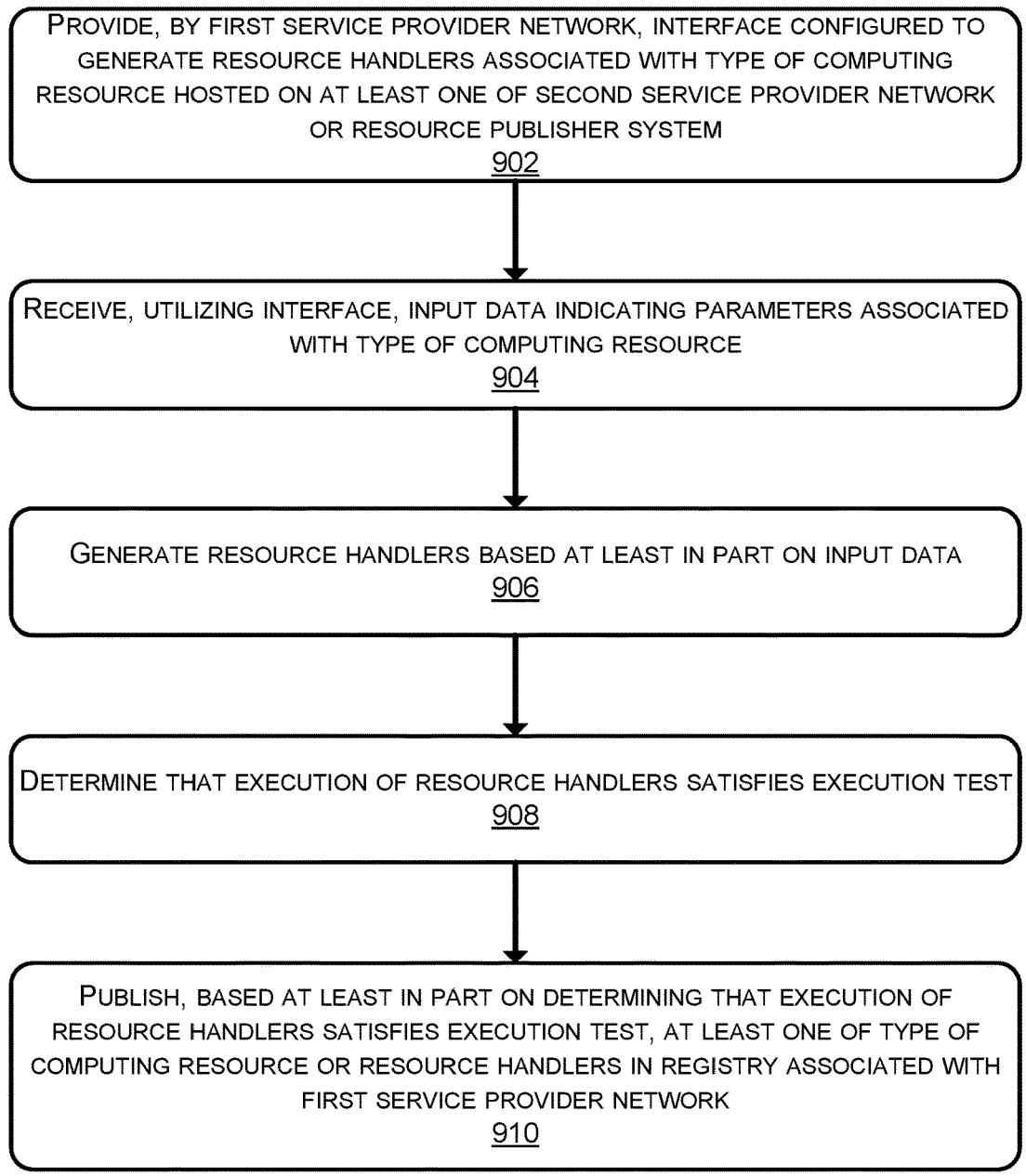
FIG. 9 illustrates a flow diagram of an example method for testing and publishing resource handlers in a cloud environment.
Figure 10:
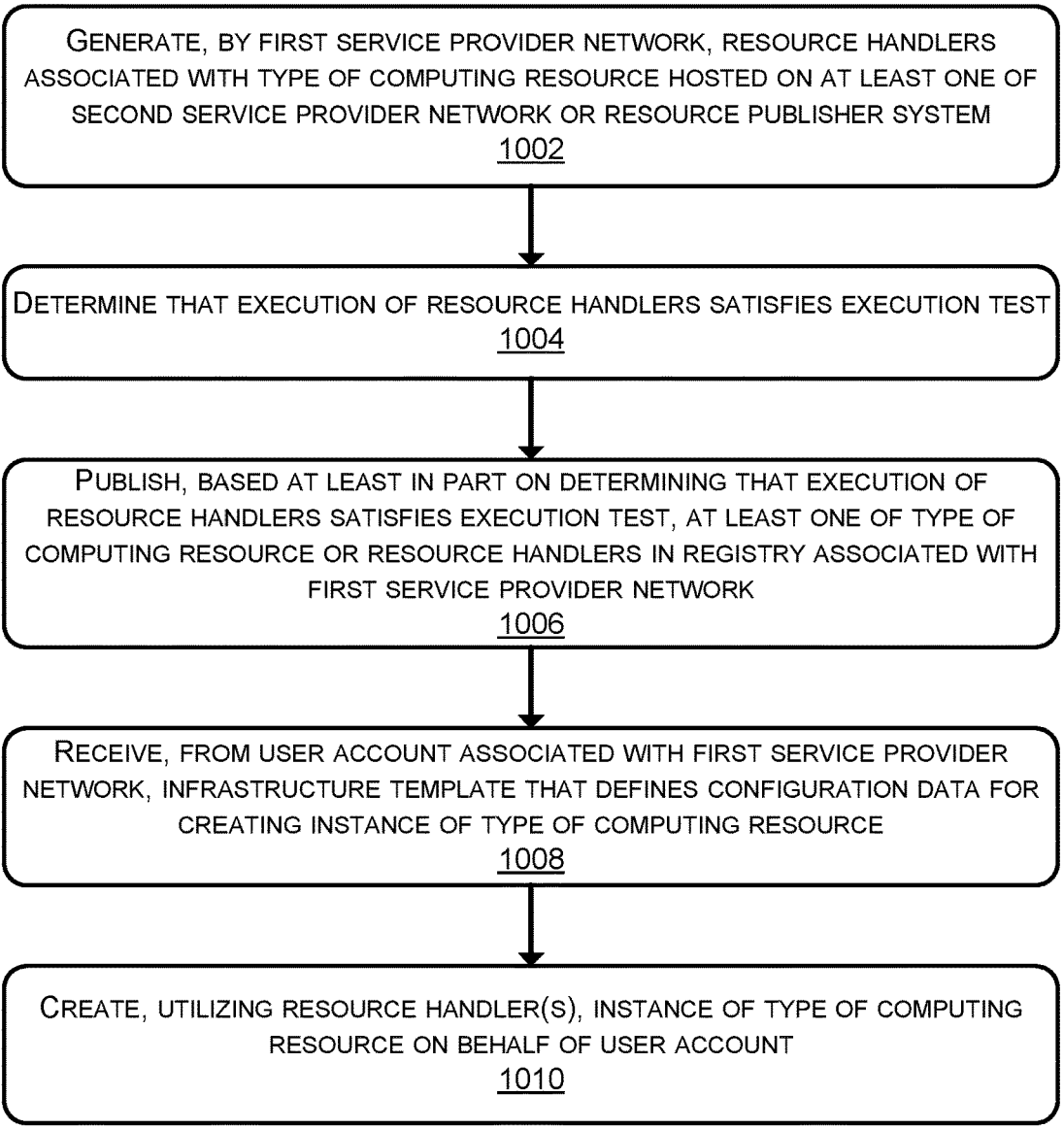
FIG. 10 illustrates a flow diagram of an example method for utilizing resource handlers in a cloud environment.

FIGS. 8-10 illustrate processes associated with testing and use of resource handlers. The processes described herein are illustrated as collections of blocks in logical flow diagrams, which represent a sequence of operations, some or all of which may be implemented in hardware, software or a combination thereof. In the context of software, the blocks may represent computer-executable instructions stored on one or more computer-readable media that, when executed by one or more processors, program the processors to perform the recited operations. Generally, computer-executable instructions include routines, programs, objects, components, data structures and the like that perform particular functions or implement particular data types. The order in which the blocks are described should not be construed as a limitation, unless specifically noted. Any number of the described blocks may be combined in any order and/or in parallel to implement the process, or alternative processes, and not all of the blocks need be executed. For discussion purposes, the processes are described with reference to the environments, architectures and systems described in the examples herein, such as, for example those described with respect to FIGS. 1-7 and 11-13, although the processes may be implemented in a wide variety of other environments, architectures and systems.

FIG. 8 illustrates a flow diagram of an example process 800 for testing, publishing, and utilizing resource handlers in a cloud environment. The order in which the operations or steps are described is not intended to be construed as a limitation, and any number of the described operations may be combined in any order and/or in parallel to implement process 800.

At block 802, the process 800 may include providing, by a service provider network, a code-development interface configured to receive input data that defines a type of a computing resource and resource handlers usable by the service provider network, individual ones of the resource handlers being associated with creating the type of the computing resource hosted on a device disposed in a network that is remote from the service provider network.

At block 804, the process 800 may include receiving, via the code-development interface, the input data defining the resource handlers. In examples, the input data may define infrastructure schemas for different resource types, such as new resource types, provided by the secondary service provider network and/or the resource publisher system. For example, the code-development interface may provide users with structured schemas, or "meta schemas," to create infrastructure templates using a structure/predefined format or syntax, but that are usable to provision and operate computing resources across a variety of different service provider networks and/or publisher systems. The schemas may define properties of the resource type of the computing resource, such as provisioning semantics. Further, the infrastructure schemas may be published or stored in an open provider registry, or an accessible repository, such that other users may access and share infrastructure schemas defining different resource types. In examples, the input may indicate the resource type and the infrastructure schemas may be generated and provided to the user via the code-development interface. In other examples, the input may include the infrastructure schemas.

Thereafter, based at least in part on receiving input data indicating the resource type and/or the schemas, the service provider network may provide, utilizing the code-development interface, one or more scaffolds associated with the resource type. Scaffolding includes techniques wherein specifications for how an application database may be used are specified. A compiler or framework may utilize these specifications, together with pre-defined code templates, to generate code that the application may utilize to perform operations associated with database entries, such as creating, reading, updating, deleting, etc. An indication of a portion of the scaffold where one or more functions for resource handlers is to be provided may be surfaced, such as by utilizing the code-development interface. The functions may represent parameters or other information specific to the resource type at issue and/or information that is important for performing operations associated with the computing resource, such as resource location information, security information, restrictions on use of the computing resource, etc. Additional data representing the one or more functions for the resource handlers may be received.

At block 806, the process 800 may include generating, utilizing the input data, the resource handlers associated with the type of the computing resource. For example, the code-development interface may utilize the functions as provided by the user to generate an artifact object associated with the resource type. Additionally, an indication of the resource type may be published to a registry service of the service provider network. Components of an orchestration account, as described in more detail elsewhere herein, may be utilized to validate the artifact object, build the resource handlers, and perform execution tests on the resource handlers prior to publishing the resource type to the registry service for use by one or more user accounts.

At block 808, the process 800 may include causing the resource handlers to execute on a test platform of the service provider network. For example, a test-routine component may be configured to generate one or more test routines associated with execution of the resource handlers. For example, periodic and/or scheduled execution tests may be performed in association with the resource handlers to ensure that execution of the resource handlers continues to be successful, such as in instances where one or more modifications to the computing resource, the resource provider account, the service provider network, and/or one or more other computing resources occurs. The resource handlers may be executed, such as on a test platform, to determine whether the resource handlers executed properly.

At block 810, the process 800 may include determining that execution of the resource handlers on the test platform resulted in the type of the computing resource being created successfully on the test platform. In examples, the execution tests may include perform multiple instances of the same test to determine that execution of the resource handlers is likely to produce repeatable successful results. In these examples, one or more variables associated with the execution tests may be modified to determine if any of those variables impact the successful execution of the resource handlers. In these and other examples, a percentage of successful executions, or similar metrics indicating a likelihood of successful execution, may be generated and utilized to determine whether execution of a given resource handler satisfies the execution tests.

At block 812, the process 800 may include based at least in part on the execution of the resource handles resulting in the type of the computing resource being created successfully, publishing at least one of the type of the computing resource or the resource handlers in a registry associated with the service provider network. In examples, the resource type may be published to the registry service and the resource handlers may be published to either the registry service and/or to a handler account to be retrieved during provisioning of the computing resource.

At block 814, the process 800 may include receiving, from a user account associated with the service provider network, an infrastructure template that defines configuration data for creating the type of the computing resource. For example, the infrastructure template may indicate that the computing resource is to be provisioned to a user account along with one or more other computing resources.

At block 816, the process 800 may include creating, utilizing at least one of the resource handlers, an instance of the type of the computing resource on behalf of the user account. For example, the handler account may identify the resource handlers corresponding to the resource type and may execute the resource handlers to create an instance of the resource type of the computing resource. To do so, the resource handlers may execute to interact with the resource provider account to create an instance of the computing resource for the user account.

Additionally, or alternatively, the process 800 may include receiving, utilizing the code-development interface, first data representing a schema defining the type of the computing resource. The process 800 may also include generating, utilizing the first data, a scaffold associated with the type of the computing resource. The process 800 may also include providing, utilizing the code-development interface, an indication of a portion of the scaffold where a function for the resource handlers is to be included. In these examples, the input data utilized to generate the resource handlers includes the function.

Additionally, or alternatively, the process 800 may include utilizing the infrastructure template defining the configuration data to create: the first computing resource in association with the device disposed in the network that is remote from the service provider network; and the second computing resource in association with the service provider network.

Additionally, or alternatively, the process 800 may include storing the first resource handlers in association with account data of the user account. The process 800 may also include receiving, utilizing the code-development interface, an indication that the computing resource has been modified and generating second resource handlers in response to receiving the indication that the computing resource has been modified. The process 800 may also include publishing the second resource handlers to the registry and determining that a number of faults associated with creating the computing resource utilizing the second resource handlers satisfies a threshold number of faults. The process 800 may also include querying the account data for the first resource handlers and publishing the first resource handlers to the registry in place of the second resource handlers in response to determining that the number of faults satisfies the threshold number of faults.

FIG. 9 illustrates a flow diagram of an example process 900 for testing and publishing resource handlers in a cloud environment. The order in which the operations or steps are described is not intended to be construed as a limitation, and any number of the described operations may be combined in any order and/or in parallel to implement process 900.

At block 902, the process 900 may include providing, by a first service provider network, an interface configured to generate resource handlers associated with a type of a computing resource hosted on at least one of a second service provider network or a resource publisher system.

At block 904, the process 900 may include receiving, utilizing the interface, input data indicating parameters associated with the type of the computing resource. In examples, the input data may define infrastructure schemas for different resource types, such as new resource types, provided by the secondary service provider network and/or the resource publisher system. For example, the code-development interface may provide users with structured schemas, or "meta schemas," to create infrastructure templates using a structure/predefined format or syntax, but that are usable to provision and operate computing resources across a variety of different service provider networks and/or publisher systems. The schemas may define properties of the resource type of the computing resource, such as provisioning semantics. Further, the infrastructure schemas may be published or stored in an open provider registry, or an accessible repository, such that other users may access and share infrastructure schemas defining different resource types. In examples, the input may indicate the resource type and the infrastructure schemas may be generated and provided to the user via the code-development interface. In other examples, the input may include the infrastructure schemas.

Thereafter, based at least in part on receiving input data indicating the resource type and/or the schemas, the service provider network may provide, utilizing the code-development interface, one or more scaffolds associated with the resource type. Scaffolding includes techniques wherein specifications for how an application database may be used are specified. A compiler or framework may utilize these specifications, together with pre-defined code templates, to generate code that the application may utilize to perform operations associated with database entries, such as creating, reading, updating, deleting, etc. An indication of a portion of the scaffold where one or more functions for resource handlers is to be provided may be surfaced, such as by utilizing the code-development interface. The functions may represent parameters or other information specific to the resource type at issue and/or information that is important for performing operations associated with the computing resource, such as resource location information, security information, restrictions on use of the computing resource, etc. Additional data representing the one or more functions for the resource handlers may be received.

At block 906, the process 900 may include generating the resource handlers based at least in part on the input data. For example, the code-development interface may utilize the functions as provided by the user to generate an artifact object associated with the resource type. Additionally, an indication of the resource type may be published to a registry service of the service provider network. Components of an orchestration account, as described in more detail elsewhere herein, may be utilized to validate the artifact object, build the resource handlers, and perform execution tests on the resource handlers prior to publishing the resource type to the registry service for use by one or more user accounts.

At block 908, the process 900 may include determining that execution of the resource handlers satisfies an execution test. For example, a test-routine component may be configured to generate one or more test routines associated with execution of the resource handlers. For example, periodic and/or scheduled execution tests may be performed in association with the resource handlers to ensure that execution of the resource handlers continues to be successful, such as in instances where one or more modifications to the computing resource, the resource provider account, the service provider network, and/or one or more other computing resources occurs. The resource handlers may be executed, such as on a test platform, to determine whether the resource handlers executed properly.

Additionally, the testing component may determine that execution of the resource handlers on the test platform resulted in an instance of the type of the computing resource being created successfully on the test platform. In examples, the execution tests may include perform multiple instances of the same test to determine that execution of the resource handlers is likely to produce repeatable successful results. In these examples, one or more variables associated with the execution tests may be modified to determine if any of those variables impact the successful execution of the resource handlers. In these and other examples, a percentage of successful executions, or similar metrics indicating a likelihood of successful execution, may be generated and utilized to determine whether execution of a given resource handler satisfies the execution tests.

At block 910, the process 900 may include publishing, based at least in part on determining that execution of the resource handlers satisfies the execution test, at least one of the type of the computing resource or the resource handlers in a registry associated with the first service provider network. In examples, the resource type may be published to the registry service and the resource handlers may be published to either the registry service and/or to a handler account to be retrieved during provisioning of the computing resource.

Additionally, or alternatively, the process 900 may include receiving first data representing a schema defining the type of the computing resource. The process 900 may also include generating, based at least in part on the first data, a scaffold associated with the type of the computing resource. The process 900 may also include providing, utilizing the interface, an indication of a portion of the scaffold where a function for the resource handlers is to be included. In these examples, the input data includes the function.

Additionally, or alternatively, the process 900 may include receiving, from a user account associated with the first service provider network, an infrastructure template that defines configuration data for creating the type of the computing resource. The process 900 may also include creating, utilizing at least one of the resource handlers, the computing resource on behalf of the user account.

Additionally, or alternatively, the process 900 may include determining that the second computing resource is associated with the first service provider network. The process 900 may also include utilizing the infrastructure template defining the configuration data to create: the first computing resource in association with the at least one of the second service provider network or the resource publisher system; and the second computing resource in association with the first service provider network.

Additionally, or alternatively, the process 900 may include generating second resource handlers based at least in part on receiving an indication that the computing resource has been modified. The process 900 may also include publishing the second resource handlers to the registry and determining that a number of faults associated with creating the computing resource utilizing the second resource handlers satisfies a threshold number of faults. The process 900 may also include publishing the first resource handlers to the registry in place of the second resource handlers based at least in part on the number of faults satisfying the threshold number of faults.

Additionally, or alternatively, the process 900 may include receiving, utilizing the interface, second input data indicating an access restriction associated with creation of the type of the computing resource, the access restriction indicating user accounts permitted to utilize the resource handlers to create the type of the computing resource. The process 900 may also include receiving, from a user account associated with the first service provider network, an infrastructure template that defines configuration data for creating the type of the computing resource. The process 900 may also include determining that the user account corresponds to one of the user accounts permitted to utilize the resource handlers. The process 900 may also include creating, utilizing at least one of the resource handlers and based at least in part on determining that the user account corresponds to one of the user accounts, the computing resource on behalf of the user account.

Additionally, or alternatively, the process 900 may include storing a first version identifier of the first resource handlers in association with a user account of the resource publisher system. The process 900 may also include generating second resource handlers based at least in part on second input data indicating second parameters associated with the type of the computing resource. The process 900 may also include storing a second version identifier of the second resource handlers in association with the user account. The process 900 may also include receiving an infrastructure template defining configuration data for creating the type of the computing resource, the configuration data including the first version identifier. The process 900 may also include creating, based at least in part on the configuration data including the first version identifier, the computing resource utilizing at least one of the first resource handlers instead of the second resource handlers.

Additionally, or alternatively, the process 900 may include generating, based at least in part on the type of the computing resource, a testing routine for testing of execution of the resource handlers over a period of time. The process 900 may also include causing testing of execution of the resource handlers to be performed based at least in part on the testing routine. The process 900 may also include generating a log of results from testing the execution of the resource handlers and providing the log of results to a user account associated with the resource publisher system.

FIG. 10 illustrates a flow diagram of an example process 1000 for utilizing resource handlers in a cloud environment. The order in which the operations or steps are described is not intended to be construed as a limitation, and any number of the described operations may be combined in any order and/or in parallel to implement process 1000.

At block 1002, the process 1000 may include generating, by a first service provider network, resource handlers associated with a type of a computing resource hosted on at least one of a second service provider network or a resource publisher system. For example, a code-development interface may utilize the functions as provided by the user to generate an artifact object associated with the resource type. Additionally, an indication of the resource type may be published to a registry service of the service provider network. Components of an orchestration account, as described in more detail elsewhere herein, may be utilized to validate the artifact object, build the resource handlers, and perform execution tests on the resource handlers prior to publishing the resource type to the registry service for use by one or more user accounts.

At block 1004, the process 1000 may include determining that execution of the resource handlers satisfies an execution test. For example, periodic and/or scheduled execution tests may be performed in association with the resource handlers to ensure that execution of the resource handlers continues to be successful, such as in instances where one or more modifications to the computing resource, the resource provider account, the service provider network, and/or one or more other computing resources occurs. The resource handlers may be executed, such as on a test platform, to determine whether the resource handlers executed properly. Additionally, the testing component may determine that execution of the resource handlers on the test platform resulted in an instance of the type of the computing resource being created successfully on the test platform. In examples, the execution tests may include perform multiple instances of the same test to determine that execution of the resource handlers is likely to produce repeatable successful results. In these examples, one or more variables associated with the execution tests may be modified to determine if any of those variables impact the successful execution of the resource handlers. In these and other examples, a percentage of successful executions, or similar metrics indicating a likelihood of successful execution, may be generated and utilized to determine whether execution of a given resource handler satisfies the execution tests At block 1006, the process 1000 may include publishing, based at least in part on determining that execution of the resource handlers satisfies the execution test, at least one of the type of the computing resource or the resource handlers in a registry associated with the first service provider network. In examples, the resource type may be published to the registry service and the resource handlers may be published to either the registry service and/or to a handler account to be retrieved during provisioning of the computing resource.

At block 1008, the process 1000 may include receiving, from a user account associated with the first service provider network, an infrastructure template that defines configuration data for creating an instance of the type of the computing resource. For example, the infrastructure template may indicate that the computing resource is to be provisioned to a user account along with one or more other computing resources.

At block 1010, the process 1000 may include creating, utilizing at least one of the resource handlers, the instance of the type of the computing resource on behalf of the user account. For example, the handler account may identify the resource handlers corresponding to the resource type and may execute the resource handlers to create an instance of the resource type of the computing resource. To do so, the resource handlers may execute to interact with the resource provider account to create an instance of the computing resource for the user account.

Additionally, or alternatively, the process 1000 may include receiving first data representing a schema defining the type of the computing resource. The process 1000 may also include generating, based at least in part on the first data, a scaffold associated with the type of the computing resource. The process 1000 may also include providing an indication of a portion of the scaffold where a function for the resource handlers is to be included. The process 1000 may also include receiving input data corresponding to the function. In these examples, generating the resource handlers may be based at least in part on the input data.

Additionally, or alternatively, the process 1000 may include receiving input data indicating a geographic region of the first service provider network that is authorized to utilize the resource handlers to create the type of the computing resource. The process 1000 may also include determining that the infrastructure template indicates the type of the computing resource is to be created in association with the geographic region. In these examples, creating the computing resource may be based at least in part on the infrastructure template indicating the computing resource is to be created in association with the geographic region.

Additionally, or alternatively, the process 1000 may include generating second resource handlers configured to create the type of the computing resource, the second resource handlers differing from the first resource handlers. The process 1000 may also include determining that a number of faults associated with creation of the type of the computing resource utilizing the second resource handlers satisfies a threshold number of faults. The process 1000 may also include publishing the first resource handlers to the registry in place of the second resource handlers based at least in part on the number of faults satisfying the threshold number of faults.

Additionally, or alternatively, the process 1000 may include generating a testing routine for testing execution of the resource handlers over a period of time, the testing routine indicating that the testing is to occur based at least in part on an indication that a functionality associated with the type of the computing resource has been implemented by the first service provider network. The process 1000 may also include causing testing of the execution of the resource handlers to be performed based at least in part on the testing routine. The process 1000 may also include generating a log of results from testing the execution of the resource handlers and providing the log of results to the user account.

Additionally, or alternatively, the process 1000 may include receiving an indication of an access restriction associated with creating the type of the computing resource, the access restriction indicating user accounts permitted to utilize the resource handlers to create the type of the computing resource. The process 1000 may also include determining that the user account from which the infrastructure template is received corresponds to at least one of the user accounts permitted to utilize the resource handlers. In these examples, creating the computing resource may be based at least in part on determining that the user account corresponds to the at least one of the user accounts permitted to utilize the resource handlers.

Additionally, or alternatively, the process 1000 may include receiving an indication of a user-identified execution test associated with the type of the computing resource. The process 1000 may also include causing the user-identified execution test to be included in the multiple execution tests.

Additionally, or alternatively, the process 1000 may include storing a first version identifier of the first resource handlers in association with the user account. The process 1000 may also include generating second resource handlers associated with the type of the computing resource and storing a second version identifier of the second resource handlers in association with the user account. The process 1000 may also include determining that the infrastructure template includes the first version identifier. In these examples, creating the computing resource utilizing the at least one of the first resource handlers may be based at least in part on the infrastructure template including the first version identifier.

Figure 11:
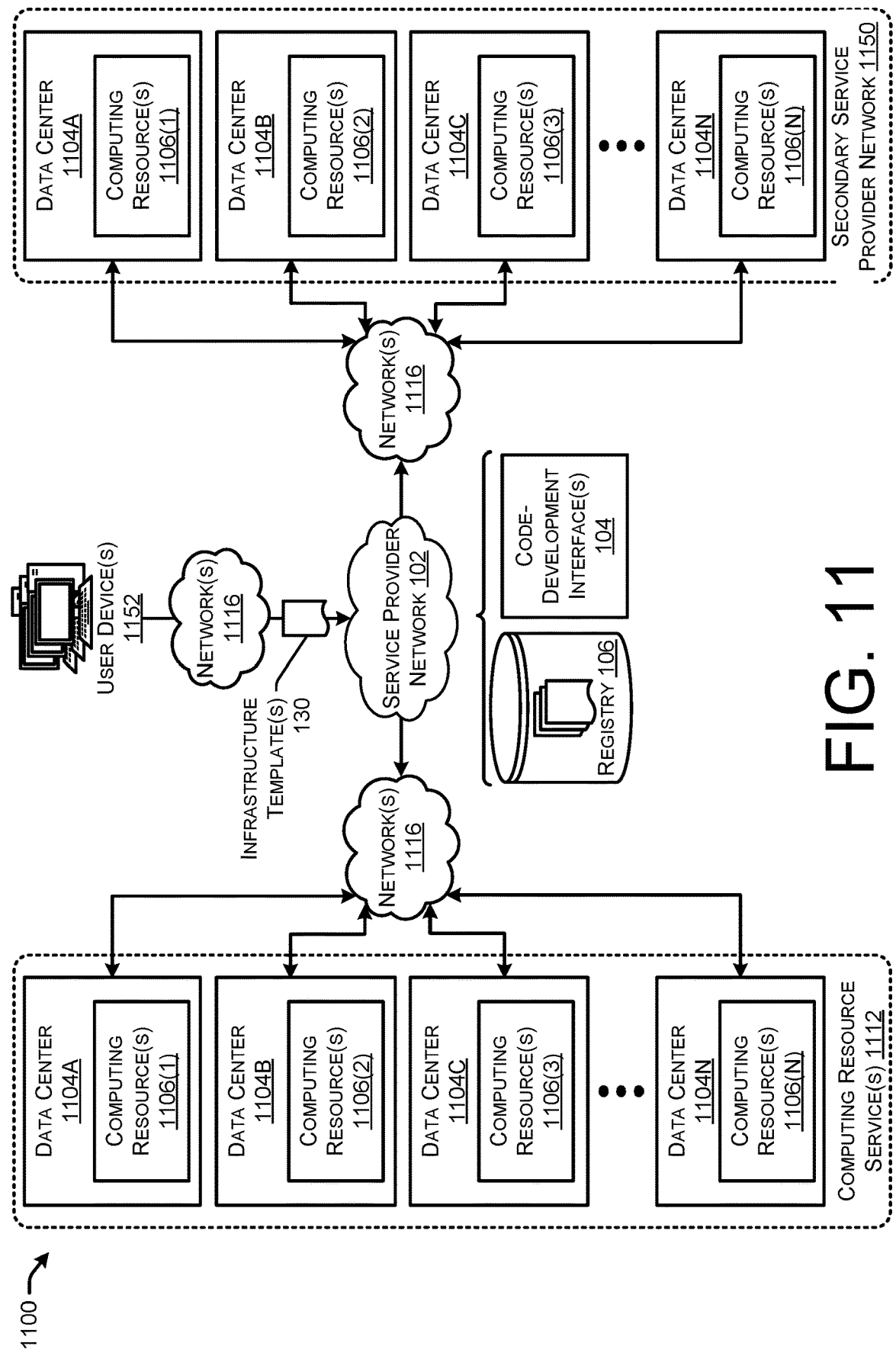
FIG. 11 illustrates a system and network diagram that shows an illustrative operating environment that includes a service provider network that can be configured to implement aspects of the functionality described herein.

FIG. 11 illustrates a system and network diagram that shows an illustrative operating environment 100 that includes a service provider network 104 that can be configured to implement aspects of the functionality described herein.

The service provider networks 102/1150 can provide computing resources 1106, like VM instances and storage, on a permanent or an as-needed basis. Among other types of functionality, the computing resources 1106 provided by the service provider network 102 may be utilized to implement the various services described above. The computing resources provided by the service provider networks 102/1150 can include various types of computing resources, such as data processing resources like VM instances, data storage resources, networking resources, data communication resources, application-container/hosting services, network services, and the like.

Each type of computing resource provided by the service provider networks 102/1150 can be general-purpose or can be available in a number of specific configurations. For example, data processing resources can be available as physical computers or VM instances in a number of different configurations. The VM instances can be configured to execute applications, including web servers, application servers, media servers, database servers, some or all of the network services described above, and/or other types of programs. Data storage resources can include file storage devices, block storage devices, and the like. The service provider networks 102/1150 can also be configured to provide other types of computing resources not mentioned specifically herein.

The computing resources 1106 provided by the service provider networks 102/1150 may be enabled in one embodiment by one or more data centers 1104A-1104N (which might be referred to herein singularly as "a data center 1104" or in the plural as "the data centers 1104"). The data centers 1104 are facilities utilized to house and operate computer systems and associated components. The data centers 1104 typically include redundant and backup power, communications, cooling, and security systems. The data centers 1104 can also be located in geographically disparate locations. One illustrative embodiment for a data center 1104 that can be utilized to implement the technologies disclosed herein will be described below with regard to FIG. 12.

The data centers 1104 may be configured in different arrangements depending on the service provider networks 102/1150. For example, one or more data centers 1104 may be included in or otherwise make-up an availability zone. Further, one or more availability zones may make-up or be included in a region. Thus, the service provider networks 102/1150 may comprise one or more availability zones, one or more regions, and so forth. The regions may be based on geographic areas, such as being located within a predetermined geographic perimeter.

The users and/or admins of the service provider networks 102/1150 may access the computing resources 1106 provided by the data centers 1104 of the service provider networks 102/1150 over any wired and/or wireless network(s) 1116 (utilizing a user device 1152 and/or another accessing-user device), which can be a wide area communication network ("WAN"), such as the Internet, an intranet or an Internet service provider ("ISP") network or a combination of such networks. For example, and without limitation, a device operated by a user of the service provider networks 102 may be utilized to access the service provider network 102 by way of the network(s) 1116. It should be appreciated that a local-area network ("LAN"), the Internet, or any other networking topology known in the art that connects the data centers 904 to remote clients and other users can be utilized. It should also be appreciated that combinations of such networks can also be utilized.

As illustrated in FIG. 11, the service provider network 102 may provide the code-development interface 104 to the user devices 1152 to define one or more infrastructure templates 130. The service provider network 102 may provide, via the code-development interface(s) 104, one or more infrastructure schema(s) that are stored in the registry 106 to facilitate the creation or defining of the infrastructure templates 130. The service provider network 102 may provision computing resources 1106 in data centers 1104 of one or both of the computing resource service(s) 112 and/or the secondary service provider network 1150. In this way, a user may be enabled to define infrastructure templates 130 via a code-development interface 104 for computing resources 1106 for a host service provider network 102, and/or for a secondary service provider network 1150 and/or system.

Figure 12:
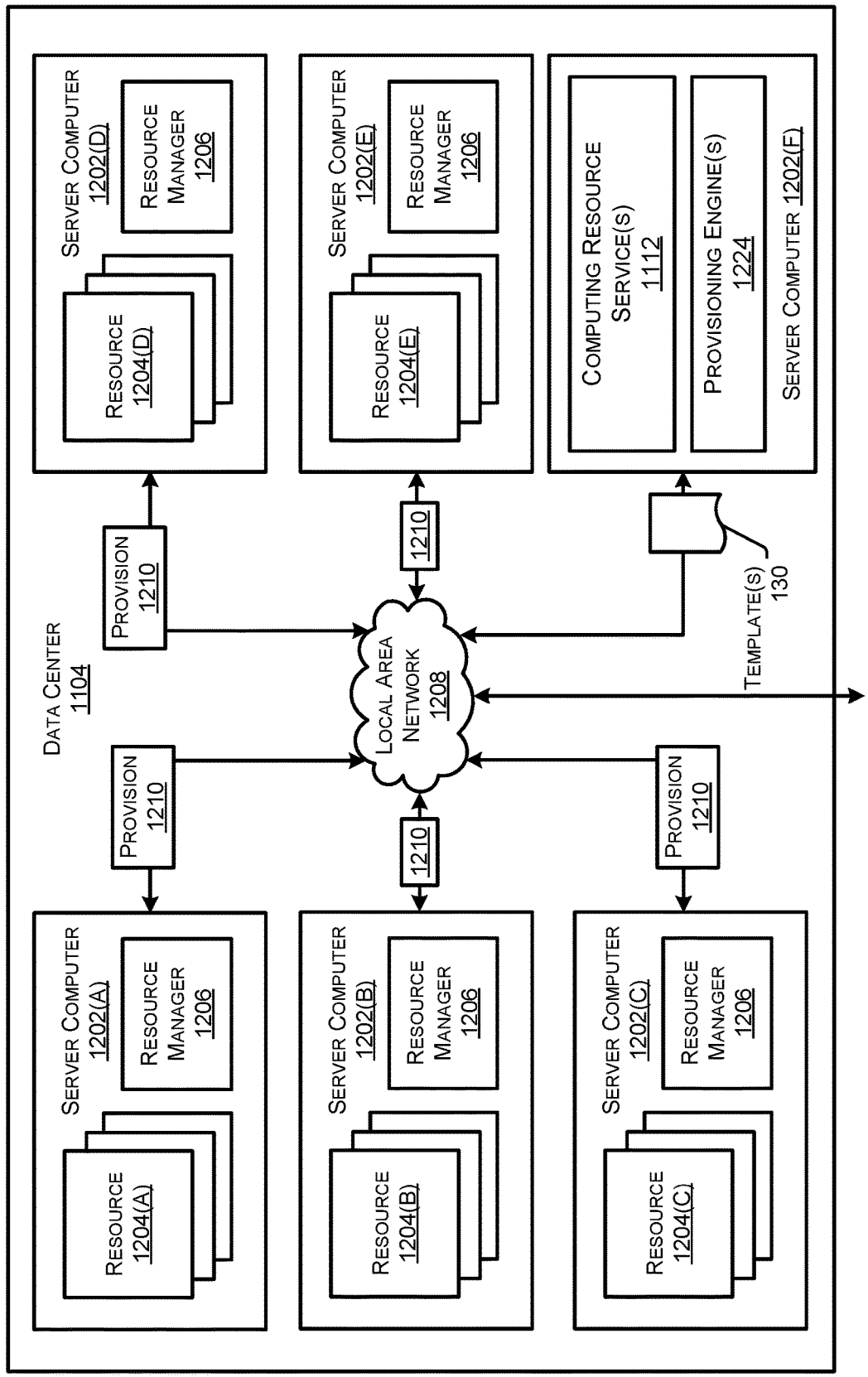
FIG. 12 illustrates a computing system diagram illustrating a configuration for a data center that can be utilized to implement aspects of the technologies disclosed herein.

FIG. 12 is a computing system diagram illustrating a configuration for a data center 1104 that can be utilized to implement aspects of the technologies disclosed herein. The example data center 1104 shown in FIG. 12 includes several server computers 1202A-1202F (which might be referred to herein singularly as "a server computer 1202" or in the plural as "the server computers 1202") for providing computing resources 1204A-1204E. In some examples, the resources 1204 and/or server computers 1202 may include, or correspond to, the computing resources described herein.

The server computers 1202 can be standard tower, rack-mount, or blade server computers configured appropriately for providing the computing resources described herein (illustrated in FIG. 12 as the computing resources 1204A-1204E). As mentioned above, the computing resources provided by the service provider network 102 can be data processing resources such as VM instances or hardware computing systems, database clusters, computing clusters, storage clusters, data storage resources, database resources, networking resources, and others. Some of the servers 1202 can also be configured to execute a resource manager 1206 capable of instantiating and/or managing the computing resources. In the case of VM instances, for example, the resource manager 1206 can be a hypervisor or another type of program configured to enable the execution of multiple VM instances on a single server computer 1202. Server computers 1202 in the data center 1104 can also be configured to provide network services and other types of services.

In the example data center 1104 shown in FIG. 12, an appropriate LAN 1208 is also utilized to interconnect the server computers 1202A-1202F. It should be appreciated that the configuration and network topology described herein has been greatly simplified and that many more computing systems, software components, networks, and networking devices can be utilized to interconnect the various computing systems disclosed herein and to provide the functionality described above. Appropriate load balancing devices or other types of network infrastructure components can also be utilized for balancing a load between each of the data centers 1204A-1204N, between each of the server computers 1202A-1202F in each data center 1104, and, potentially, between computing resources in each of the server computers 1202. It should be appreciated that the configuration of the data center 1204 described with reference to FIG. 12 is merely illustrative and that other implementations can be utilized.

As illustrated, one or more server computers 1202(F) may support the computing resource service(s) 1112 and/or a provisioning engine 1224. The computing resource service(s) 1112 and/or provisioning engine 1224 may utilize template(s) 130 to provision 1210 resources 1204 in the server computers 1202 for users.

Figure 13:
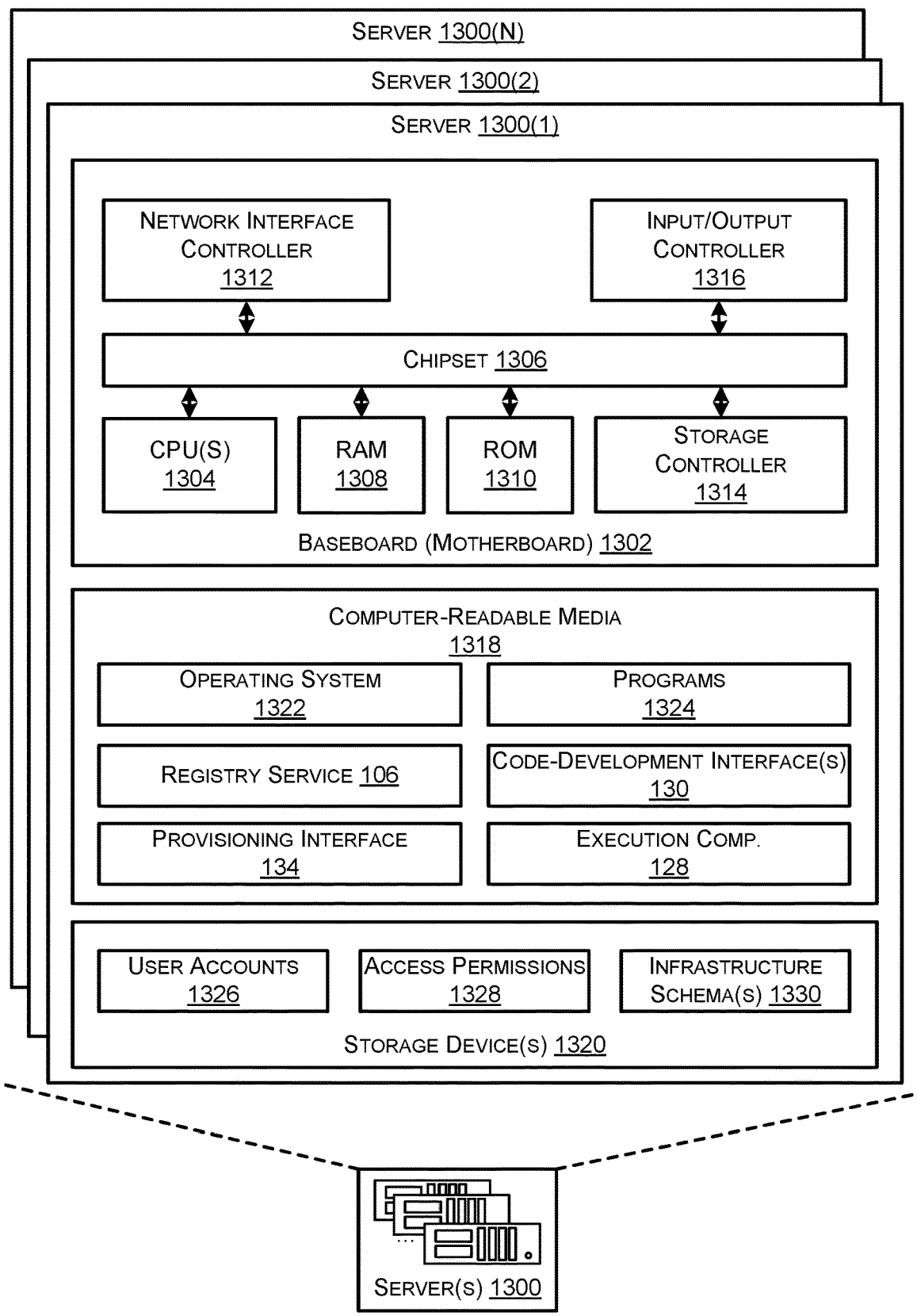
FIG. 13 is a computer architecture diagram showing an illustrative computer hardware architecture for implementing one or more server devices that can be utilized to implement aspects of the various technologies presented herein.

FIG. 13 is a computer architecture diagram showing an illustrative computer hardware architecture for implementing one or more server devices that can be utilized to implement aspects of the various technologies presented herein. The computer architecture shown in FIG. 13 illustrates one or more of a conventional server computer, workstation, desktop computer, laptop, tablet, network appliance, e-reader, smartphone, or other computing device, and can be utilized to execute any of the software components presented herein.

The server(s) 1300 includes a baseboard 1302, or "motherboard," which is a printed circuit board to which a multitude of components or devices can be connected by way of a system bus or other electrical communication paths. In one illustrative configuration, one or more central processing units ("CPUs") 1304 operate in conjunction with a chipset 1306. The CPUs 1304 can be standard programmable processors that perform arithmetic and logical operations necessary for the operation of the server(s) 1300.

The CPUs 1304 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 1306 provides an interface between the CPUs 1304 and the remainder of the components and devices on the baseboard 1302. The chipset 1306 can provide an interface to a RAM 1308, used as the main memory in the server(s) 1300. The chipset 1306 can further provide an interface to a computer-readable storage medium such as a read-only memory ("ROM") 1310 or non-volatile RAM ("NVRAM") for storing basic routines that help to startup the server(s) 1300 and to transfer information between the various components and devices. The ROM 1310 or NVRAM can also store other software components necessary for the operation of the server(s) 1300 in accordance with the configurations described herein.

The server(s) 1300 can operate in a networked environment using logical connections to remote computing devices and computer systems through a network, such as the network 1208. The chipset 1306 can include functionality for providing network connectivity through a NIC 1312, such as a gigabit Ethernet adapter. The NIC 1312 is capable of connecting the server(s) 1300 to other computing devices over the network 1208 (or 1116). It should be appreciated that multiple NICs 1312 can be present in the server(s) 1300, connecting the computer to other types of networks and remote computer systems.

The server(s) 1300 can be connected to one or more computer-readable media 1318 storing software components for the server devices 1300, and one or more mass storage devices 1320 for storing data. The computer-readable media 1318 can store an operating system 1322, programs 1324, and data, which have been described in greater detail herein. The mass storage device 1320 can be connected to the server(s) 1300 through a storage controller 1314 connected to the chipset 1306. The mass storage device 1320 can consist of one or more physical storage units. The storage controller 1314 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

Generally, the computer-readable media 1318 may store the components described herein as executable, computer-readable instructions. For instance, the components may include the code-development interface(s) 130, the registry service 106, the provisioning interface 134, and/or the execution component 128. The components may be stored and/or executed on a single server, or on a system of two or more severs 1300.

The server(s) 1300 can store data on the mass storage device 1320 by transforming the physical state of the physical storage units to reflect the information being stored. The specific transformation of physical state can depend on various factors, in different embodiments of this description. Examples of such factors can include, but are not limited to, the technology used to implement the physical storage units, whether the mass storage device 1020 is characterized as primary or secondary storage, and the like.

For example, the server(s) 1300 can store information to the mass storage device 1320 by issuing instructions through the storage controller 1314 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The server(s) 1300 can further read information from the mass storage device 1320 by detecting the physical states or characteristics of one or more particular locations within the physical storage units.

In addition to the mass storage device 1320 described above, the server(s) 1300 can have access to the computer-readable storage media 1318 to store and retrieve information, such as program modules, data structures, or other data. It should be appreciated by those skilled in the art that computer-readable storage media is any available media that provides for the non-transitory storage of data and that can be accessed by the server(s) 1300. In some examples, the operations performed by the service provider network 102, and or any components included therein, may be supported by one or more devices similar to server(s) 1300. Stated otherwise, some or all of the operations performed by the service-provider network 102, and or any components included therein, may be performed by one or more computer devices 1300 operating in a cloud-based arrangement. As shown, the storage device 1320 may store user accounts 1326 for the different users of subscribers, and access permissions 1328 that are defined for the different user accounts 1326.

By way of example, and not limitation, computer-readable storage media 1318 can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the mass storage device 1320 can store an operating system 1322 utilized to control the operation of the server(s) 1300. According to one embodiment, the operating system comprises the LINUX operating system. According to another embodiment, the operating system comprises the WINDOWS® SERVER operating system from MICROSOFT Corporation of Redmond, Wash. According to further embodiments, the operating system can comprise the UNIX operating system or one of its variants. It should be appreciated that other operating systems can also be utilized. The mass storage device 1320 can store other system or application programs and data utilized by the server(s) 1300.

In one embodiment, the mass storage device 1320 or other computer-readable storage media 1318 is encoded with computer-executable instructions which, when loaded into the server(s) 1300, transform the computer from a general-purpose computing system into a special-purpose computer capable of implementing the embodiments described herein. These computer-executable instructions transform the server(s) 1300 by specifying how the CPUs 1104 transition between states, as described above. According to one embodiment, the server(s) 1300 has access to computer-readable storage media storing computer-executable instructions which, when executed by the server(s) 1300, perform the various processes described above with regard to FIGS. 1-12. The server(s) 1300 can also include computer-readable storage media having instructions stored thereupon for performing any of the other computer-implemented operations described herein.

The server(s) 1300 can also include one or more input/output controllers 1316 for receiving and processing input from a number of input devices, such as a keyboard, a mouse, a touchpad, a touch screen, an electronic stylus, or other type of input device. Similarly, an input/output controller 1316 can provide output to a display, such as a computer monitor, a flat-panel display, a digital projector, a printer, or other type of output device. It will be appreciated that the server(s) 1300 might not include all of the components shown in FIG. 13, can include other components that are not explicitly shown in FIG. 13, or might utilize an architecture completely different than that shown in FIG. 13.

In various examples, the service provider network 102 may be part of or associated with a cloud-based service network that can be configured to implement aspects of the functionality described herein.

While the foregoing invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims.

What is claimed is:

1. A computer-implemented method comprising:
providing, by a service provider network, a code-development interface configured to receive input data that defines a type of a computing resource and first resource handlers usable by the service provider network, individual ones of the first resource handlers being associated with creating the type of the computing resource hosted on a device disposed in a network that is remote from the service provider network;
receiving, via the code-development interface, the input data defining the first resource handlers;
generating, utilizing the input data, the first resource handlers associated with the type of the computing resource;
storing the first resource handlers in association with account data of a user account associated with the service provider network;
publishing the type of the computing resource in a registry associated with the service provider network;
receiving, utilizing the code-development interface, an indication that the computing resource has been modified;
generating second resource handlers in response to receiving the indication that the computing resource has been modified;
publishing the second resource handlers to the registry;
determining that a number of faults associated with creating the computing resource utilizing the second resource handlers satisfies a threshold number of faults;
querying the account data for the first resource handlers;
publishing the first resource handlers to the registry in place of the second resource handlers in response to determining that the number of faults satisfies the threshold number of faults;
receiving, from the user account, an infrastructure template that defines configuration data for creating the type of the computing resource; and
creating, utilizing at least one of the first resource handlers, an instance of the type of the computing resource on behalf of the user account.

2. The computer-implemented method of claim 1 comprising:
receiving, utilizing the code-development interface, first data representing a schema defining the type of the computing resource;
generating, utilizing the first data, a scaffold associated with the type of the computing resource;

providing, utilizing the code-development interface, an indication of a portion of the scaffold where a function for the first resource handlers is to be included; and wherein the input data utilized to generate the first resource handlers includes the function.

3. The computer-implemented method of claim 1, wherein the computing resource comprises a first computing resource, the type comprises a first type, the infrastructure template defines the configuration data for creating a second type of a second computing resource, and the computer-implemented method further comprises:

utilizing the infrastructure template defining the configuration data to create:

the instance of the first type of the first computing resource in association with the device disposed in the network that is remote from the service provider network; and an instance of the second type of the second computing resource in association with the service provider network.

4. The computer-implemented method of claim 1, further comprising:

causing at least one of the first resource handlers or the second resource handlers to execute on a test platform of the service provider network;

determining that execution of at least one of the first resource handlers or the second resource handlers on the test platform resulted in the type of the computing resource being created successfully on the test platform; and wherein publishing the first resource handlers and the second resource handlers to the registry is based at least in part on the execution of at least one of the first resource handlers or the second resource handlers resulting in the type of the computing resource being created successfully.

5. A computer-implemented method comprising:

providing, by a first service provider network, an interface configured to generate first resource handlers associated with a type of a computing resource hosted on at least one of a second service provider network or a resource publisher system;

receiving, utilizing the interface, first input data indicating first parameters associated with the type of the computing resource;

generating the first resource handlers based at least in part on the first input data;

storing a first version identifier of the first resource handlers in association with a user account of the resource publisher system;

generating second resource handlers based at least in part on second input data indicating second parameters associated with the type of the computing resource;

storing a second version identifier of the second resource handlers in association with the user account;

publishing at least one of the type of the computing resource, the first resource handlers, or the second resource handlers in a registry associated with the first service provider network;

receiving an infrastructure template defining configuration data for creating an instance of the type of the computing resource, the configuration data including the first version identifier; and creating, based at least in part on the configuration data including the first version identifier, the instance of the type of the computing resource utilizing at least one of the first resource handlers instead of the second resource handlers.

6. The computer-implemented method of claim 5, further comprising:

receiving first data representing a schema defining the type of the computing resource;

generating, based at least in part on the first data, a scaffold associated with the type of the computing resource;

providing, utilizing the interface, an indication of a portion of the scaffold where a function for the first resource handlers is to be included; and wherein the first input data includes the function.

7. The computer-implemented method of claim 5, further comprising:

receiving, from a user account associated with the first service provider network, the infrastructure template that defines the configuration data for creating the type of the computing resource; and creating, utilizing at least one of the first resource handlers or the second resource handlers, an instance of the type of the computing resource on behalf of the user account.

8. The computer-implemented method of claim 7, wherein the computing resource comprises a first computing resource, the type comprises a first type, the infrastructure template defines the configuration data for creating a second type of a second computing resource, and the computer-implemented method further comprises:

determining that the second computing resource is associated with the first service provider network; and utilizing the infrastructure template defining the configuration data to create:

the instance of the first type of the first computing resource in association with the at least one of the second service provider network or the resource publisher system; and an instance of the second type of the second computing resource in association with the first service provider network.

9. The computer-implemented method of claim 5, further comprising:

generating the second resource handlers based at least in part on receiving an indication that the computing resource has been modified;

publishing the second resource handlers to the registry;

determining that a number of faults associated with creating an instance of the type of the computing resource utilizing the second resource handlers satisfies a threshold number of faults; and publishing the first resource handlers to the registry in place of the second resource handlers based at least in part on the number of faults satisfying the threshold number of faults.

10. The computer-implemented method of claim 5, further comprising:

receiving, utilizing the interface, second input data indicating an access restriction associated with creation of the type of the computing resource, the access restriction indicating user accounts permitted to utilize the first resource handlers to create the instance of the type of the computing resource;

receiving, from a user account associated with the first service provider network, the infrastructure template that defines the configuration data for creating the instance of the type of the computing resource;

determining that the user account corresponds to one of the user accounts permitted to utilize the first resource handlers; and creating, utilizing at least one of the first resource handlers and based at least in part on determining that the user account corresponds to one of the user accounts, the instance of the type of the computing resource on behalf of the user account.

11. The computer-implemented method of claim 5, further comprising:

generating, based at least in part on the type of the computing resource, a testing routine for testing of execution of the first resource handlers over a period of time;

causing testing of the execution of the first resource handlers to be performed based at least in part on the testing routine;

generating a log of results from testing the execution of the first resource handlers; and providing the log of results to a user account associated with the resource publisher system.

12. The computer-implemented method of claim 5, further comprising:

determining that execution of at least one of the first resource handlers or the second resource handlers satisfies an execution test; and wherein publishing at least one of the type of the computing resource, the first resource handlers, or the second resource handlers in the registry associated with the first service provider network is based at least in part on determining that execution of at least one of the first resource handlers or the second resource handlers satisfies the execution test.

13. A system comprising:

one or more processors; and one or more computer-readable media storing computer-executable instructions that, when executed by the one or more processors, cause the one or more processors to perform operations comprising:

generating, by a first service provider network, first resource handlers associated with a type of a computing resource hosted on at least one of a second service provider network or a resource publisher system;

storing a first version identifier of the first resource handlers in association with a user account associated with the first service provider network;

generating second resource handlers associated with the type of the computing resource;

storing a second version identifier of the second resource handlers in association with the user account;

publishing at least one of the type of the computing resource, the first resource handlers, or the second resource handlers in a registry associated with the first service provider network;

receiving, from the user account, an infrastructure template that defines configuration data for creating an instance of the type of the computing resource, the infrastructure template including the first version identifier; and creating, utilizing at least one of the first resource handlers, the instance of the type of the computing resource on behalf of the user account based at least in part on the infrastructure template including the first version identifier.

14. The system of claim 13, the operations further comprising:

receiving first data representing a schema defining the type of the computing resource;

generating, based at least in part on the first data, a scaffold associated with the type of the computing resource;

providing an indication of a portion of the scaffold where a function for the first resource handlers is to be included;

receiving input data corresponding to the function; and wherein generating the first resource handlers comprises generating the first resource handlers based at least in part on the input data.

15. The system of claim 13, the operations further comprising:

receiving input data indicating a geographic region of the first service provider network that is authorized to utilize the first resource handlers to create the type of the computing resource;

determining that the infrastructure template indicates the type of the computing resource is to be created in association with the geographic region; and wherein creating the instance of the type of the computing resource comprises creating the instance of the type of the computing resource based at least in part on the infrastructure template indicating the computing resource is to be created in association with the geographic region.

16. The system of claim 13, the operations further comprising:

generating the second resource handlers configured to create the type of the computing resource, the second resource handlers differing from the first resource handlers;

determining that a number of faults associated with creation of the type of the computing resource utilizing the second resource handlers satisfies a threshold number of faults; and publishing the first resource handlers to the registry in place of the second resource handlers based at least in part on the number of faults satisfying the threshold number of faults.

17. The system of claim 13, the operations further comprising:

generating a testing routine for testing execution of the first resource handlers over a period of time, the testing routine indicating that the testing is to occur based at least in part on an indication that a functionality associated with the type of the computing resource has been implemented by the first service provider network;

causing testing of the execution of the first resource handlers to be performed based at least in part on the testing routine;

generating a log of results from testing the execution of the first resource handlers; and providing the log of results to the user account.

18. The system of claim 13, the operations further comprising:

receiving an indication of an access restriction associated with creating the type of the computing resource, the access restriction indicating user accounts permitted to utilize the first resource handlers to create the type of the computing resource;

determining that the user account from which the infrastructure template is received corresponds to at least one of the user accounts permitted to utilize the first resource handlers; and wherein creating the instance of the type of the computing resource comprises creating the instance of the type of the computing resource based at least in part on determining that the user account corresponds to the at least one of the user accounts permitted to utilize the first resource handlers.

19. The system of claim 13, the operations further comprising:

determining that execution of at least one of the first resource handlers or the second resource handlers satisfies at least one of multiple execution tests;

receiving an indication of a user-identified execution test associated with the type of the computing resource; and causing the user-identified execution test to be included in the multiple execution tests.

20. The system of claim 13, the operations further comprising:

determining that execution of at least one of the first resource handlers or the second resource handlers satisfies an execution test; and wherein publishing at least one of the type of the computing resource, the first resource handlers, or the second resource handlers in the registry associated with the first service provider network is based at least in part on determining that execution of at least one of the first resource handlers or the second resource handlers satisfies the execution test.

* * * * *